United States Patent
Campbell et al.

(10) Patent No.: US 8,775,754 B2
(45) Date of Patent: Jul. 8, 2014

(54) MEMORY CONTROLLER AND METHOD OF SELECTING A TRANSACTION USING A PLURALITY OF ORDERED LISTS

(75) Inventors: Michael Andrew Campbell, Waterbeach (GB); Christopher Edwin Wrigley, Saffron Walden (GB); Brett Stanley Feero, Austin, TX (US)

(73) Assignee: ARM Limited, Cambridge (GB)

( * ) Notice: Subject to any disclaimer, the term of this patent is extended or adjusted under 35 U.S.C. 154(b) by 364 days.

(21) Appl. No.: 13/067,775

(22) Filed: Jun. 24, 2011

(65) Prior Publication Data
US 2012/0331197 A1 Dec. 27, 2012

(51) Int. Cl.
*G06F 12/00* (2006.01)

(52) U.S. Cl.
USPC ............... 711/162; 711/E12.103; 709/228

(58) Field of Classification Search
None
See application file for complete search history.

(56) References Cited

U.S. PATENT DOCUMENTS

| | | | | |
|---|---|---|---|---|
| 6,088,772 A * | 7/2000 | Harriman et al. | ............. | 711/158 |
| 6,578,117 B2 * | 6/2003 | Weber | ........................... | 711/151 |
| 2005/0097265 A1 * | 5/2005 | Shrader et al. | ................ | 711/105 |
| 2006/0168383 A1 | 7/2006 | Lin | | |
| 2009/0055580 A1 * | 2/2009 | Moscibroda et al. | ......... | 711/104 |
| 2009/0248994 A1 * | 10/2009 | Zheng et al. | ................... | 711/151 |

OTHER PUBLICATIONS

International Search Report and Written Opinion of the International Searching Authority mailed Aug. 1, 2012 in PCT/GB2012/051203.
Rixner, et al., "Memory Access Scheduling", 2000 ISCA, pp. 128-138.

* cited by examiner

*Primary Examiner* — Reginald Bragdon
*Assistant Examiner* — Brendan Lillis
(74) *Attorney, Agent, or Firm* — Nixon & Vanderhye P.C.

(57) ABSTRACT

A memory controller is for controlling access to a memory device of the type having a non-uniform access timing characteristic. An interface receives transactions issued from at least one transaction source and a buffer temporarily stores as pending transactions those transactions received by the interface that have not yet been issued to the memory device. The buffer maintains a plurality of ordered lists (having a number of entries) for the stored pending transactions, including at least one priority based ordered list and at least one access timing ordered list. Each entry being associated with one of the pending transactions, and ordered within its priority based ordered list based on the priority indication of the associated pending transaction. Arbitration circuitry performs an arbitration operation during which the plurality of ordered lists are referenced so as to select a winning transaction to be issued to the memory device.

28 Claims, 14 Drawing Sheets

MEMORY CONTROLLER AND METHOD OF SELECTING A TRANSACTION USING A PLURALITY OF ORDERED LISTS

FIELD OF THE INVENTION

The present invention relates to a memory controller and method of operation of such a memory controller, and in particular to a memory controller for controlling access to a memory device of the type having a non-uniform access timing characteristic such that a time taken to access a memory address is dependent on preceding access activity within the memory device.

DESCRIPTION OF THE PRIOR ART

Many modern data processing systems use memory devices having non-uniform access timing characteristics. For example, often there will be an initial time overhead involved in enabling a particular row of memory addresses within the memory device to be accessed, but if a sequence of accesses then take place to addresses within that row, that initial overhead can be amortized across the multiple accesses. However, if each access in the sequence accesses a different row, then the overhead for enabling a row is incurred separately for each access, thereby giving rise to a longer access timing characteristic for such a sequence of accesses, when compared with a sequence of accesses that all access the same row.

One type of memory device that exhibits the above property is a memory device comprising a plurality of banks, with each bank comprising a plurality of rows, and with each row needing to be activated prior to that row being accessed. An example of such a memory device is a DRAM (Dynamic Random Access Memory) memory device. Given that each rows needs to be activated prior to that row being accessed, it will be appreciated that the access timing for a particular memory address specified by a transaction will vary dependent on whether the row containing that memory address is currently already activated or not.

The need to activate rows before they are accessed not only gives rise to a performance penalty as discussed above, but additionally gives rise to a power consumption penalty, due to the power consumed in performing the row activation process. Accordingly, it is considered desirable to reorder transactions issued to such a memory so as to seek to improve access times, and in particular to ensure that wherever possible multiple accesses take place to a particular row when that row has been activated. The article "Memory Access Scheduling" by S Rixner et al, Computer Systems Laboratory, Stanford University, California, USA, appearing in Proceedings of the 27$^{th}$ International Symposium on Computer Architecture 2000, 14 Jun. 2000, pages 128-138, discusses DRAM architectures, and a number of memory access scheduling techniques which can be used in an attempt to reorder memory operations in order to exploit the non-uniform access times of the DRAM.

Since memory bandwidth is becoming a limiting factor in achieving higher performance in various types of systems, for example media processing systems, such techniques for reordering memory operations in order to reduce the observed access times can be very beneficial. However, in many real-world applications, it is also necessary to take account of other metrics within the system incorporating such a memory device. In particular, if memory access reordering is performed in isolation in order to optimise memory access timing, there is a possibility that such reordering may adversely impact another metric of the system to an unacceptable level.

As an example, it is often the case that some form of priority indication is associated with each transaction issued within a data processing system. This may be an explicit priority indication added by the master device issuing the transaction, or may be an implicit priority indication inferred from the transaction. For example, it may be understood that the activities of certain master devices are more important (or at least more latency intolerant) than activities being performed by other master devices, and hence transactions issued by such master devices can be arranged to have an inferred higher priority. Often, such priority indications are indicative of a quality of service required for those transactions, and hence it is important to ensure that the desire to reorder transactions issued to the memory device in order to reduce access times is balanced against such quality of service requirements.

Accordingly, it would be desirable to provide an improved memory controller which enables such a balance to be achieved.

SUMMARY OF THE INVENTION

Viewed from a first aspect, the present invention provides a memory controller for controlling access to a memory device, the memory device having a non-uniform access timing characteristic such that a time taken to access a memory address is dependent on preceding access activity within the memory device, the memory controller comprising: an interface configured to receive transactions issued from at least one transaction source, each transaction specifying the memory address to be accessed for that transaction and including a priority indication associated with that transaction; a storage configured to temporarily store as pending transactions those transactions received by the interface that have not yet been issued by the memory controller to the memory device, the storage maintaining a plurality of ordered lists for the stored pending transactions, including at least one priority based ordered list and at least one access timing ordered list; each priority based ordered list having a number of entries, each entry being associated with one of said pending transactions, and each entry being ordered within its priority based ordered list based on the priority indication of the associated pending transaction; each access timing ordered list having a number of entries, each entry being associated with one of said pending transactions, and the pending transactions associated with each access timing ordered list forming a group of transactions whose memory addresses can be efficiently accessed by the memory device having regard to the non-uniform access timing characteristic once the memory address of one transaction in said group has been accessed; and arbitration circuitry configured to perform an arbitration operation during which said plurality of ordered lists are referenced so as to select from said pending transactions a winning transaction to be issued to said memory device, the storage being arranged to remove any entry for the winning transaction from the plurality of ordered lists; if when the arbitration operation is performed, the winning transaction selected last time the arbitration operation was performed had an entry in one of said at least one access timing ordered lists, and that at least one access timing ordered list is still non-empty, the arbitration operation is arranged, unless a predetermined exception condition exists, to select as the winning transaction one of the pending transactions having an entry in that at least one access timing ordered list.

In accordance with the present invention, two different types of ordered list are used to keep track of pending transactions waiting to be dispatched to the memory device, a first type of list being a priority based ordered list and a second type of list being an access timing ordered list. The arbitration circuitry is arranged to refer to both types of list when performing an arbitration operation in order to select a winning transaction to be issued to the memory device. Once a winning transaction has been selected from one of the access timing ordered lists, the arbitration circuitry is predisposed (in the absence of a predetermined exception condition) to select subsequent winning transactions from that access timing ordered list whilst that access timing ordered list continues to contain entries for pending transactions.

Such an approach enables a balance to be achieved between the reordering of pending transactions to improve access timing in the memory device, and the need to take account of the priority indications associated with pending transactions in order to ensure that high priority transactions are not delayed unduly.

In one embodiment, if the winning transaction selected last time the arbitration operation was performed did not have an entry in one of said at least one access timing ordered lists, or did have an entry in one of said at least one access timing ordered lists but that at least one access timing ordered list is now empty, the arbitration operation is arranged to select as the winning transaction the pending transaction having an entry at a head position within one of said at least one priority based ordered lists. This ensures that the higher priority pending transactions get serviced in a timely manner.

In one embodiment, further steps can be taken to ensure that high priority pending transactions get serviced in a timely manner, even if the number of entries referenced by a particular access timing ordered list becomes quite large. In particular in one embodiment the memory controller further comprises limiter circuitry configured to monitor at least the number of consecutive winning transactions selected from one of said access timing ordered lists, and to assert a limiter signal on occurrence of a threshold condition. The predetermined exception condition is detected if said limiter signal is asserted, and the arbitration circuitry is then responsive to assertion of the limiter signal to cause a next performance of the arbitration operation to select as the winning transaction the pending transaction having an entry at a head position within one of said at least one priority based ordered lists, even if the winning transaction selected last time the arbitration operation was performed had an entry in one of said at least one access timing ordered lists, and that at least one access timing ordered list is still non-empty.

In one such embodiment the threshold condition may merely take the form of some maximum count value, the count value being reset each time a winning transaction is selected from a priority based ordered list, and being incremented each time a winning transaction is selected from an access timing ordered list. Accordingly, it will be appreciated that if the arbitration circuitry successively selects winning requests from a particular access timing ordered list, the count value will increase until a point where the threshold condition is reached. On reaching the threshold condition, the arbitration circuitry then selects the next winning transaction from the relevant priority based ordered list even though the access timing ordered list is not yet empty.

In a modified embodiment, the limiter circuitry may not merely take the form of a counter, but instead may associate a decreasing priority with an increase in the number of winning transactions selected from a particular access timing ordered list. If the limiter circuitry is also then provided with an indication of the highest priority pending transaction within the relevant priority based ordered list, it can determine a point at which it is appropriate to stop selecting winning transactions from the access timing ordered list, and instead to switch to selecting the next winning transaction from the priority based ordered list.

The priority based ordered list can be arranged in a variety of ways. However, in one embodiment each priority based ordered list comprises a number of sub-lists, each entry being in one sub-list such that the entries of each sub-list relate to transactions having the same priority indication, the sub-lists being ordered within their priority based ordered list based on the priority indication, and within each sub-list the entries of that sub-list being ordered based on temporal order of receipt of the associated pending transactions by said interface. Hence, in such embodiments, each priority based ordered list comprises a set of sub-lists, one per priority indication value associated with the pending transactions, and with temporal ordering being maintained amongst the transactions having the same priority indication value.

In one embodiment, within each access timing ordered list the entries are ordered based on temporal order of receipt of the associated pending transactions by said interface.

The memory device can take a variety of forms. However, in one embodiment the memory device comprises a plurality of banks, and said at least one priority based ordered list comprises a separate priority based ordered list for each bank for which there is a pending transaction.

Further, in one embodiment each bank comprises a plurality of rows, each row needing to be activated prior to that row being accessed, such that the access timing to a specified memory address varies dependent on whether the row containing that specified memory address has already been activated or not. One type of memory device that has such a structure is a DRAM (Dynamic Random Access Memory) memory device. In such an embodiment, said at least one access timing ordered list may comprise a separate access timing ordered list for each row of each bank for which there is a pending transaction.

In one embodiment, the memory controller further comprises allocation circuitry, responsive to each transaction received by said interface, to allocate an entry for that transaction in at least one of said plurality of ordered lists. By performing the allocation at the time each transaction is received by the interface, the allocation process can be removed from the critical path. In particular, at the time a winning request needs to be selected by the arbitration circuitry, the arbitration operation may be performed quickly and simply merely by reference to the plurality of ordered lists maintained within the temporary storage.

In one particular embodiment, for each transaction received by said interface, the allocation circuitry is configured to allocate entries for that transaction in both one of said at least one priority based ordered lists and one of said at least one access timing ordered lists. Hence, each pending transaction will typically have two entries, one within a priority based ordered list and one within an access timing ordered list.

The entries within each priority based ordered list can take a variety of forms. However, in one embodiment, within each priority based ordered list, each entry comprises a head indicator and a tail indicator, the head indicator being set if the entry is at a head position in the priority based ordered list and the tail indicator being set if the entry is at a tail position in the priority based ordered list. Each entry further comprises a pointer to a next entry in the priority based ordered list, the next entry being at a position more remote from the head position than the entry whose pointer points to that next entry. This provides a simple and effective mechanism for maintaining a relative ordering between the various entries in each priority based ordered list, whilst clearly flagging the entry at the head and tail positions of the priority based ordered list.

In one embodiment, each entry further identifies the priority indication of the associated pending transaction. This assists in the allocation process required when a new entry needs to be allocated into the priority based ordered list.

In one particular embodiment, each entry further identifies the priority indication of the pending transaction associated with said next entry. This further assists in the allocation process, since the allocation process can then analyse the entries to find a particular entry having a particular combination of priority indication for its associated pending transaction and priority indication for the pending transaction associated with the next entry.

In particular, in one embodiment, the memory controller further comprises: allocation circuitry, responsive to a current transaction received by said interface, to allocate an entry for said current transaction in a chosen one of said at least one priority based ordered lists chosen having regard to the memory address specified by the current transaction. The allocation circuitry is configured to identify an entry in the chosen priority based ordered list whose priority indication for the associated pending transaction is greater than or equal to the priority indication for the current transaction, and whose priority indication for the pending transaction associated with said next entry is less than the priority indication for the current transaction. The allocation circuitry is then further configured to add into the chosen priority based ordered list a new entry for the current transaction that is ordered so as to be adjacent to said identified entry but more remote from the head position than said identified entry.

If during the above analysis, the identified entry under consideration has no next entry, i.e. the identified entry is at the tail position in the list, then the priority indication for the pending transaction associated with the next entry may be set to some predetermined value which is interpreted as being lower than the priority indication for the current transaction, such that where appropriate an entry at the tail position within the list can be identified using the above mechanism, and the new entry can then be added at a position forming the new tail position of the list.

In one embodiment, the pointer for the identified entry is updated to point to the new entry and the pointer for the new entry is arranged to point to said next entry.

In accordance with an optional enhancement, the earlier mentioned next entry can also be modified when the new entry is inserted such that the priority indication of the pending transaction associated with that next entry is updated, for example to indicate an increased priority for the pending transaction associated with that next entry. There are a number of ways in which this can be done, for example merely by increasing the priority indication by a predetermined amount. However, in one embodiment, the priority indication of the associated pending transaction is updated to correspond to the priority indication of the current transaction associated with the new entry. Such a priority elevation technique (also referred to herein as a "buddying" scheme) can prevent indefinite blocking of lower priority transactions thus allowing for predictable latency calculations. Whilst the priority elevation technique can in one embodiment be arranged to only affect the next entry following the new entry, it can in an alternative embodiment be used to elevate the priority of more than one entry following the newly inserted entry.

In one embodiment, if the new entry is at the tail position in the priority based ordered list, the allocation circuitry causes the tail indicator for the new entry to be set and the tail indicator for the entry previously at the tail position to be cleared.

Further, in one embodiment, if there is no entry in the chosen priority based ordered list whose priority indication for the associated pending transaction is greater than or equal to the priority indication for the current transaction, the allocation circuitry is configured to add the new entry for the current transaction at the head position, the head indicator for the new entry being set and the pointer for the new entry being arranged to point to the entry that was previously at the head position, the entry previously at the head position having its head indicator cleared.

It is possible that when performing the above described allocation process, the chosen priority based ordered list may currently have no entries, for example because the current transaction to be allocated is directed at a bank for which there are no pending transactions. In that case, the allocation circuitry may be arranged to cause the new entry allocated for the current transaction to have both its head indicator and its tail indicator set, that entry in effect creating the relevant priority based ordered list and being the only entry of that list.

There are a number of ways in which each entry within an access timing ordered list can be configured. However, in one embodiment, each entry has a similar configuration to the entries in the priority based ordered lists, in that each entry comprises a head indicator and a tail indicator, the head indicator being set if the entry is at a head position in the access timing ordered list and the tail indicator being set if the entry is at a tail position in the access timing ordered list, and each entry further comprises a pointer to a next entry in the access timing ordered list, the next entry being at a position more remote from the head position than the entry whose pointer points to that next entry.

In one embodiment, burst transactions issued by a transaction source may be received by the memory controller. It is often the case that the burst size that such a transaction source may specify for the burst transaction may exceed the maximum burst size allowed by the memory device, and accordingly such a burst transaction may be converted into a plurality of linked burst transactions for the memory device. Each linked burst transaction is treated as a separate transaction by the memory controller. In one embodiment, the allocation circuitry within the memory controller can be arranged to allocate a first of said linked burst transactions to an entry in one of said at least one access timing ordered lists, and then to allocate all of the remaining linked transactions to spur-list entries of a spur-list associated with said entry.

By arranging the various linked burst transactions in such a way, it enables the arbitration circuitry to treat the linked burst transactions as a special case. In particular, if when the arbitration operation is performed, the winning transaction selected last time the arbitration operation was performed had an entry in one of said at least one access timing ordered lists, and that entry has said spur-list associated with it, the arbitration operation is arranged to select as the winning transaction one of the linked transactions having a spur-list entry in said spur-list. By such an approach, the remaining linked burst transactions can be prioritised. This is beneficial since it is often the case that elsewhere in the system, certain resources may be tied up waiting for such a burst transaction to complete, and accordingly when the memory device starts to process such a burst transaction by handling the first linked transaction, it is highly beneficial if the remaining linked transactions can then be processed in rapid succession.

In one embodiment, only when all of the linked transactions have been selected as winning requests is the arbitration operation arranged to select as a subsequent winning transaction the transaction associated with said next entry in the access timing ordered list.

Considering the earlier mentioned example of a memory device comprising a plurality of banks, with each bank comprising a plurality of rows, then in one embodiment, within each access timing ordered list, each entry comprises an indication of the bank and row for which the access timing ordered list is provided.

The priority indication associated with each transaction can take a variety of forms. Whilst it may be an implicit priority indication derived from the transaction details (for example an indication of the master device issuing the transaction), in one embodiment the priority indication is an explicit priority indication provided within a field of the transaction. In one particular embodiment, the priority indication is a quality of service (QoS) level indication.

The predetermined exception condition that, when present, will interrupt the arbitration operation's bias towards selecting winning transactions from an access timing ordered list when a preceding transaction was selected from that access timing ordered list, can take a variety of forms. However, in one embodiment, the predetermined exception condition is a condition causing the priority indication of a particular pending transaction to be changed to represent a high priority, the arbitration circuitry being configured, in the presence of that predetermined exception condition, to select as the winning transaction said particular pending transaction, and the storage being arranged to remove any entry for that winning transaction from the plurality of ordered lists.

Such a condition may be a timeout condition triggered, for example, when there is a maximum latency allowable for a particular transaction and that maximum latency is approaching. In another embodiment, a hazard condition may be detected elsewhere within the system which requires a particular transaction to be processed before the hazard can be cleared.

In one particular embodiment where the earlier-described linked burst transactions are created and allocated to spur lists within an access timing ordered list, then the arbitration circuitry will first ensure that any remaining linked burst transactions are selected as winning requests before it responds to the predetermined exception condition being present, and thereafter selects as the winning transaction the particular pending transaction whose priority has been elevated to become the highest priority pending transaction.

The memory controller of the above described embodiments can be used for any type of transactions. For example, such techniques could be employed for write transactions issued to the memory device. However, in one embodiment the techniques are employed in respect of read transactions issued to the memory device. It will be appreciated that in another embodiment the above described mechanisms can be replicated, so that both read transactions and write transactions can be subjected to the above described techniques.

Whilst in one embodiment the arbitration circuitry is arranged to only perform one arbitration operation at a time, and hence to select only a single winning transaction at a time, in an alternative embodiment the arbitration circuitry may be configured to perform multiple arbitration operations in parallel, and hence select multiple winning transactions at a time. This is useful in situations where the memory device is able to process multiple winning transactions in parallel.

Viewed from a second aspect, the present invention provides a method of controlling access to a memory device, the memory device having a non-uniform access timing characteristic such that a time taken to access a memory address is dependent on preceding access activity within the memory device, the method comprising: receiving transactions issued from at least one transaction source, each transaction specifying the memory address to be accessed for that transaction and including a priority indication associated with that transaction; temporarily storing in a storage, as pending transactions, those received transactions that have not yet been output from an output interface to the memory device, the storage maintaining a plurality of ordered lists for the stored pending transactions, including at least one priority based ordered list and at least one access timing ordered list; arranging each priority based ordered list to have a number of entries, each entry being associated with one of said pending transactions, and each entry being ordered within its priority based ordered list based on the priority indication of the associated pending transaction; arranging each access timing ordered list to have a number of entries, each entry being associated with one of said pending transactions, and the pending transactions associated with each access timing ordered list forming a group of transactions whose memory addresses can be efficiently accessed by the memory device having regard to the non-uniform access timing characteristic once the memory address of one transaction in said group has been accessed; and performing an arbitration operation during which said plurality of ordered lists are referenced so as to select from said pending transactions a winning transaction to be output from said output interface to said memory device, and removing any entry for the winning transaction from the plurality of ordered lists; if when the arbitration operation is performed, the winning transaction selected last time the arbitration operation was performed had an entry in one of said at least one access timing ordered lists, and that at least one access timing ordered list is still non-empty, the arbitration operation being arranged, unless a predetermined exception condition exists, to select as the winning transaction one of the pending transactions having an entry in that at least one access timing ordered list.

Viewed from a third aspect, the present invention provides a memory controller for controlling access to a memory device, the memory device having a non-uniform access timing characteristic such that a time taken to access a memory address is dependent on preceding access activity within the memory device, the memory controller comprising: interface means for receiving transactions issued from at least one transaction source, each transaction specifying the memory address to be accessed for that transaction and including a priority indication associated with that transaction; storage means for temporarily storing as pending transactions those transactions received by the interface means that have not yet been issued by the memory controller to the memory device, the storage means maintaining a plurality of ordered list means for the stored pending transactions, including at least one priority based ordered list means and at least one access timing ordered list means; each priority based ordered list means having a number of entries, each entry being associated with one of said pending transactions, and each entry being ordered within its priority based ordered list means based on the priority indication of the associated pending transaction; each access timing ordered list means having a number of entries, each entry being associated with one of said pending transactions, and the pending transactions associated with each access timing ordered list means forming a group of transactions whose memory addresses can be efficiently accessed by the memory device having regard to the non-uniform access timing characteristic once the memory address of one transaction in said group has been accessed; and arbitration means for performing an arbitration operation during which said plurality of ordered list means are referenced so as to select from said pending transactions a winning transaction to be issued to said memory device, the storage means for removing any entry for the winning transaction from the plurality of ordered list means; if when the arbitration operation is performed, the winning transaction selected last time the arbitration operation was performed had an entry in one of said at least one access timing ordered list means, and that at least one access timing ordered list means is still non-empty, the arbitration operation, unless a predetermined exception condition exists, selects as the winning transaction one of the pending transactions having an entry in that at least one access timing ordered list means.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
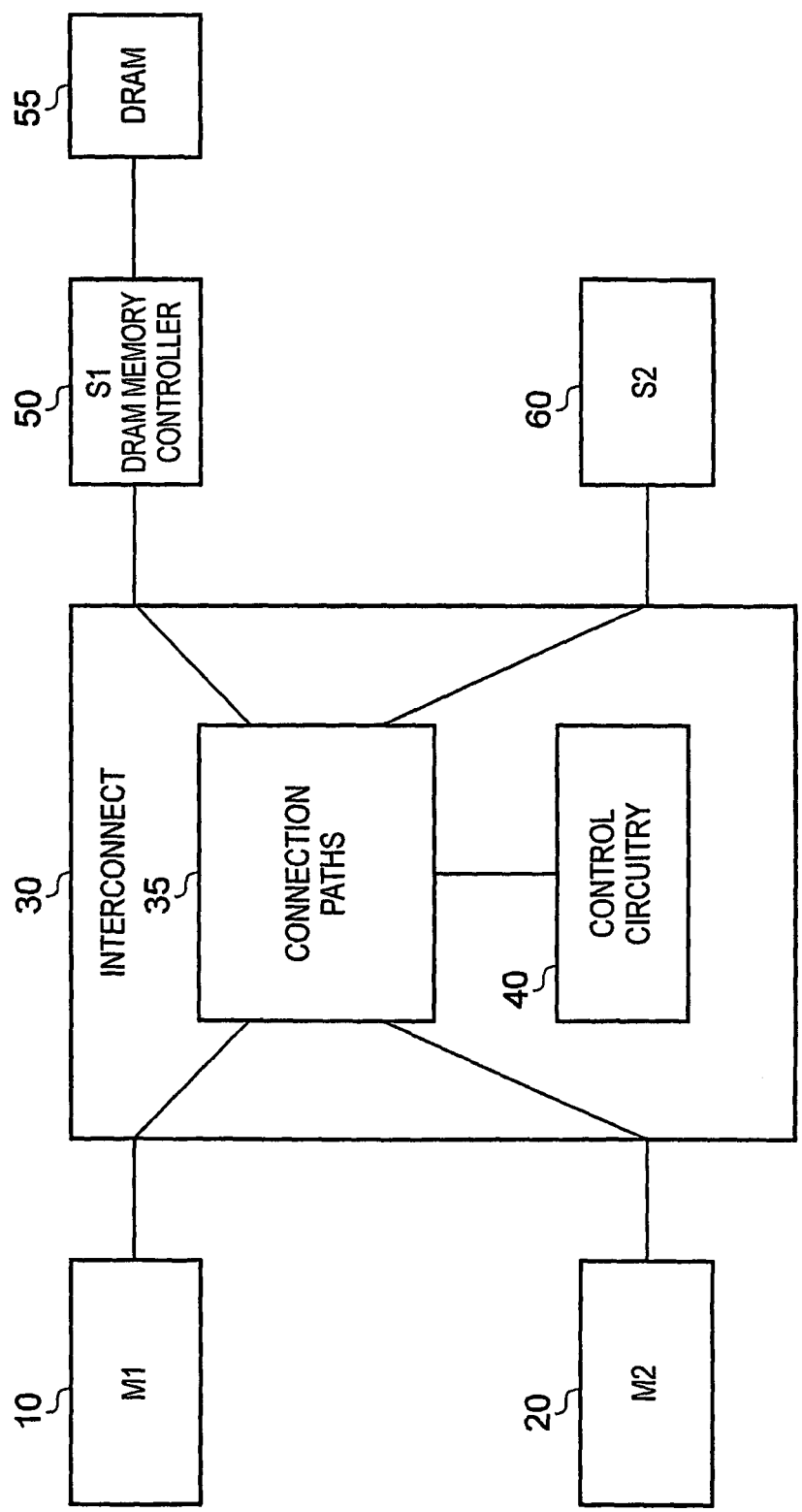
FIG. 1 is a block diagram of a data processing system incorporating a memory controller in accordance with one embodiment.

FIG. 1 is a block diagram of a data processing system including a plurality of master devices 10, 20 coupled via an interconnect circuit 30 with a number of slave devices 55, 60. One of the slave devices is a DRAM memory device 55 that is coupled to the interconnect 30 via a DRAM memory controller 50.

The interconnect circuitry 30 couples the master devices and the slave devices via a number of connection paths 35 to enable transactions to be performed. Each transaction consists of an address transfer from a master device to a slave device, and one or more data transfers between the master device and the slave device. There are a number of known protocols that may be used for the handling of transactions within the interconnect 30. For the purpose of illustration, in the embodiments described below, it will be assumed that the interconnect circuitry employs a split transaction protocol in which separate address channels and data channels are provided, and the timing of data transfers is decoupled with respect to the timing of address transfers of a particular transaction. In one particular embodiment, the interconnect circuitry operates in accordance with the AXI protocol, and the connection paths 35 of the interconnect circuitry provide five channels, namely a read address channel, a write address channel, a read data channel, a write data channel and a write response channel.

When each master device initiates a transaction by issuing an address transfer, that master device will typically issue a transaction identifier with the address transfer to identify the transaction, so that said transaction identifier can then be used in association with the data transfers of the transaction in order to match those data transfers with the address transfer.

Within the control circuitry 40 of the interconnect circuitry 30, ID addition/removal circuitry may be provided to ensure that transactions from different master devices can be uniquely identified within the interconnect circuitry 30. For example, such ID addition and removal circuitry may be arranged, for each transaction identifier issued by the associated master device, to extend that transaction identifier with a master number that allows the routing of responses back to that master device. Similarly, when transfers are routed back to the master device, the ID addition/removal circuitry will strip off the master number before the response transfer is returned to the associated master device 10, 20. In addition to allowing the routing of responses back to the appropriate master device, the extension of the transaction identifier with the master number to create a new form of transaction identifier within the interconnect circuitry 30 also has the consequence that any slave device 50, 55, 60 that has the capability to reorder transactions having different transaction identifiers is then able to also reorder transactions from different master devices even if they originally had the same transaction identifier.

It will further be understood that the control circuitry 40 of the interconnect 30 may also include additional functionality. For example, in order to detect potential deadlock conditions, cyclic dependency avoidance scheme (CDAS) control circuitry may be provided within the interconnect 30 in order to detect sequences of transactions that could cause deadlock if allowed to proceed simultaneously, and to take action to avoid such deadlock occurring. The control circuitry 40 may also include scoreboarding and hazard detection circuits to monitor for various hazard conditions, for example a read after write hazard, with the aim of ensuring that such hazard conditions are handled correctly. This may for example involve stalling onward propagation of one transaction until an earlier transaction has completed.

Considering the DRAM memory controller 50, it will be appreciated from the above discussion that the DRAM memory controller 50 will receive a stream of transactions, with each transaction typically having a transaction identifier. As will be discussed in more detail below, in accordance with the embodiments of the DRAM memory controller described herein, the DRAM memory controller is able to reorder those transactions with the aim of improving access times to the DRAM 55. The DRAM memory controller includes some internal buffering to ensure that any responses can be reordered prior to output to the interconnect circuitry 30 so as to conform with ordering constraints of the transaction protocol used by the interconnect 30. For example, it may be required that for any transactions having the same transaction identifier, the responses returned from the slave have to be returned in order, and hence any reordering performed locally in respect of such transactions to improve DRAM efficiency needs to be reversed before output of the response transfers to the interconnect 30.

Another property of transactions is that they may include a priority indication, either as an explicit field of the transaction, or by virtue of some inference that can be determined from the transaction (for example it may be understood that the transactions issued by master 110 have a higher priority than the transactions issued by master 220). In one particular embodiment described herein, each transaction includes an explicit priority indication in the form of a quality of service (QoS) indication. In accordance with the techniques described herein, the DRAM memory controller 50 seeks to reorder transactions so as to improve access times to the DRAM 55, but whilst also having regard to the QoS level indications of the transactions so as to ensure that the transactions are serviced appropriately having regards to their QoS indication.

Figure 2:
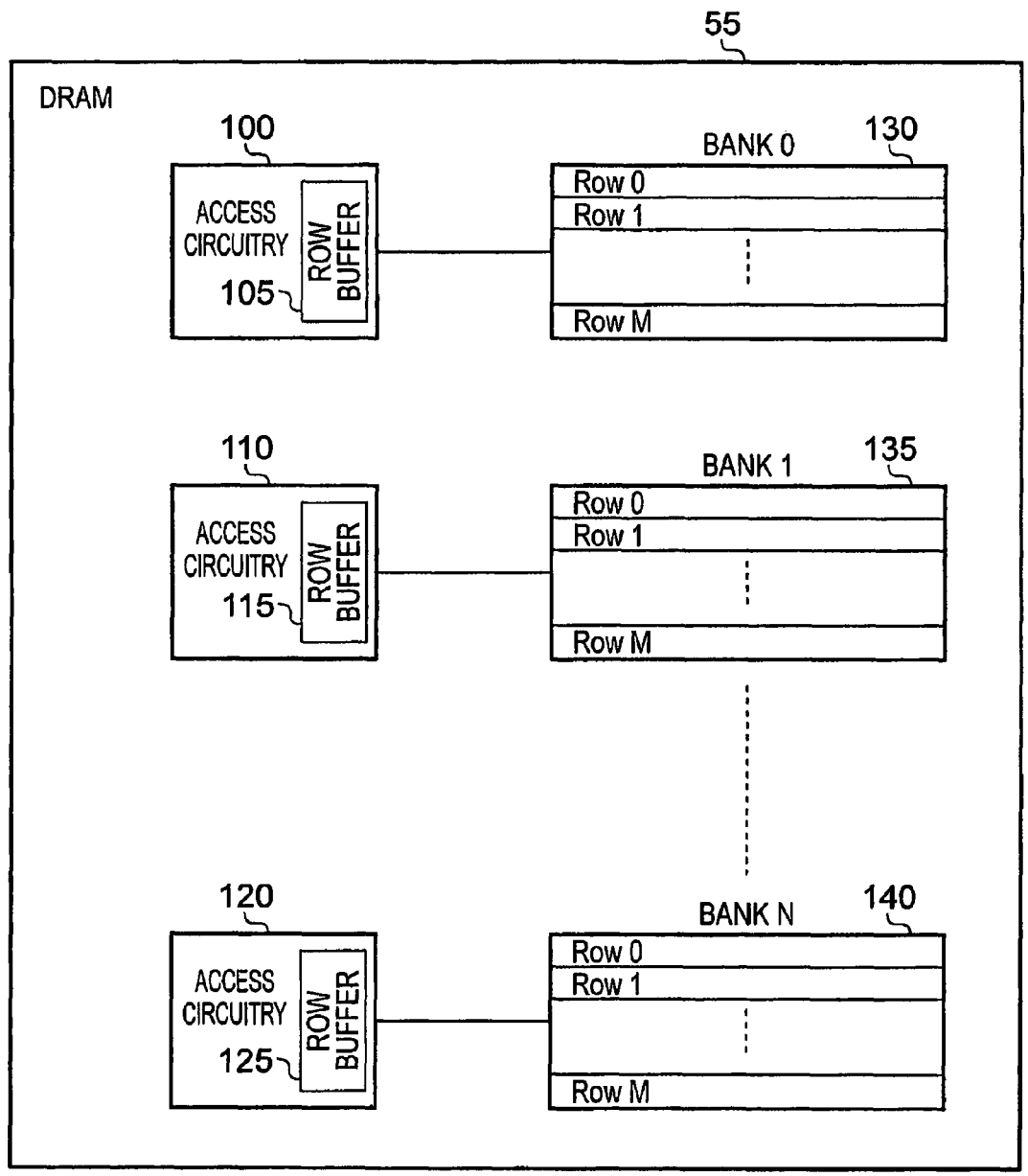
FIG. 2 is a block diagram of the DRAM memory of FIG. 1 in accordance with one embodiment.

FIG. 2 schematically illustrates the DRAM 55 of FIG. 1 in accordance with one embodiment. The DRAM 55 consists of a plurality of banks 130, 135, 140, each bank consisting of a plurality of rows. Associated with each bank there is provided access circuitry 100, 110, 120 which is responsive to access commands issued by the DRAM memory controller 50. Each access circuit 100, 110, 120 includes a row buffer 105, 115, 125 for storing at least one row of data from the associated bank. In order to access a data value in a row, that row first has to be moved into relevant row buffer via a RAS command issued from the memory controller, such a RAS command also being referred to herein as an activate command. Once the row has been stored in the row buffer, then individual memory addresses within that row can be accessed via CAS commands issued from the memory controller. Ultimately, when accesses to the row have been completed, or when a new row needs to be accessed, a precharge command is issued from the memory controller to cause the current contents of the row within the row buffer to be stored back into the associated bank within the DRAM 55.

It will hence be appreciated that there is a significant access time penalty, and indeed power consumption penalty, incurred when activating a row so that its contents can subsequently be accessed, and accordingly it is beneficial if, once a row has been activated and accordingly its contents have been stored within the row buffer, a plurality of accesses to the memory addresses of that row are then performed before the row's contents are then subsequently returned to the bank. As will be discussed in more detail below, whilst the DRAM memory controller of the described embodiments can perform reordering of transactions in order to achieve this, and thereby reduce access times and power consumption, it also takes account of the priority indications associated with transactions in order to ensure that such reordering does not adversely affect meeting QoS requirements for the transactions.

Figure 3:
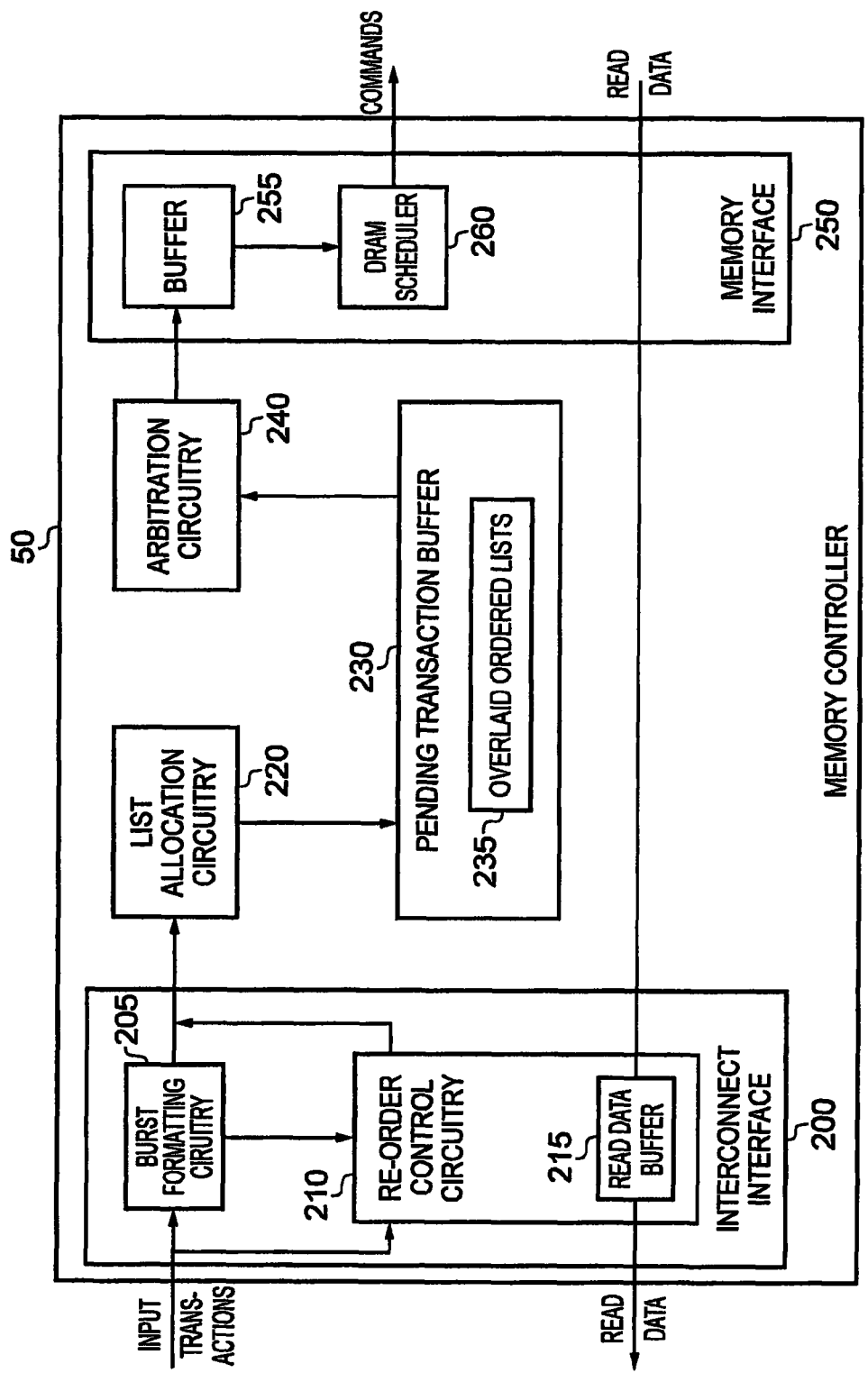
FIG. 3 is a block diagram of the DRAM memory controller of FIG. 1 in accordance with one embodiment.

FIG. 3 schematically illustrates the DRAM memory controller 50 of FIG. 1 in accordance with one embodiment. Input transactions received from the interconnect 30 are provided to an input interface 200, which may include some local reorder control circuitry 210. This reorder control circuitry 210 may for example alter the transaction identifiers of the input transactions so as to, in effect, decouple multiple transactions having the same transaction identifier, in order to allow those transactions to be handled out of order by the DRAM memory. However, it will be necessary for those transactions to be reordered prior to any response being output back to the interconnect 30, since in this embodiment it is assumed that the interconnect 30 requires that the responses from the DRAM for transactions having the same transaction identifier are returned in order. Accordingly, a data buffer 215 can be provided within the reorder control circuitry 210 to allow for local reordering prior to the response data being output to the interconnect 30.

Whilst in one embodiment the techniques to be described below can be used in association with write transactions, it will be assumed for the purposes of the example of FIG. 3 that the input transactions are all read transactions, and accordingly the response output to the interconnect circuitry is the read data. For a write transaction, the response will be the status information provided over the write response channel. If it is desired to utilise the techniques for both read transactions and write transactions, the circuitry illustrated in FIG. 3 can be wholly or partly replicated, so that one set of circuitry is provided for read transactions, and a duplicate set of circuitry is provided for write transactions.

As shown in FIG. 3, the interface 200 may optionally include burst formatting circuitry 205. In particular, one of the master devices 10, 20 may issue a burst transaction having a burst length that exceeds the burst length allowed for an access to the DRAM memory. Accordingly, such a burst transaction received by the interface 200 may be converted by the burst formatting circuitry 205 into a plurality of linked burst transactions, each linked burst transaction being treated as a separate transaction by the memory controller. An internal transaction identifier can be provided for each linked burst transaction from the reorder control circuitry 210.

The DRAM memory controller 50 includes a pending transaction buffer 230 for temporarily storing as pending transactions the transactions received by the interface 200 that have not yet been issued by the memory controller 50 to the DRAM 55. In addition to maintaining the relevant details of each transaction, the pending transaction buffer 230 maintains a set of overlaid ordered lists 235, these lists including a priority based ordered list for each bank for which there is at least one pending transaction (such priority based ordered lists being referred to herein as QoS lists) and an access timing ordered list for each row of each bank for which there is at least one pending transaction (such lists being referred to herein as row-hit lists). As each transaction is received by the interface 200, it is passed to the list allocation circuitry 220, which is arranged to allocate that pending transaction an entry in at least one of the ordered lists 235. In particular, in one embodiment, the list allocation circuitry 220 allocates each pending transaction an entry in both the relevant QoS list and the relevant row-hit list. More details of the lists, and of the operation of the list allocation circuitry 220, will be provided later with reference to the remaining figures.

In one embodiment, the buffer 230 comprises a plurality of buffer entries, each buffer entry being used to store the details of a pending transaction. Information associated with each buffer entry is then used to describe the associated transaction's position in the relevant QoS list and row-hit list. The lists themselves are then virtual lists.

When it is necessary to issue a new transaction to the DRAM memory 55, for example because the memory controller 50 has determined that the DRAM memory 55 has capacity to process a new transaction, the arbitration circuitry 240 is arranged to perform an arbitration operation during which the plurality of ordered lists 235 are referred to in order to select from the pending transactions a winning transaction to be issued to the DRAM 55. The operation of the arbitration circuitry will be described in more detail later, but in general terms the arbitration operation performed by the arbitration circuitry is biased towards continuing to select entries from one of the row-hit lists when the last winning transaction has been selected from that row-hit list. However, certain conditions will cause the arbitration circuitry to deviate from that natural bias, in order to ensure that the QoS levels associated with individual transactions are taken into account.

The details of each winning transaction selected by the arbitration circuitry 240 are output to the memory interface 250, which includes a local buffer 255 for storing the transactions, and a DRAM scheduler 260 for creating a sequence of commands to the DRAM in order to implement each transaction. The buffer 255 is typically required since it may be necessary to issue multiple commands from the DRAM scheduler in order to perform the access required by each transaction, and in addition the interface path between the DRAM scheduler 260 and the DRAM 55 may be such that only a single command can be issued per clock cycle. Hence, there may be multiple transactions in the process of execution by the memory interface 250, for example transactions directed to different banks of the DRAM, and the various commands required to perform those transactions will be scheduled by the DRAM scheduler 260 having regard to the availability of the required access circuits 100, 110, 120.

As discussed earlier, the commands issued by the DRAM scheduler 260 may include RAS commands to activate a row, a series of CAS commands to access particular memory addresses within the row, and pre-charge commands to store the contents of a row buffer back into the relevant row of the DRAM. If transactions can be reordered such that a series of transactions are handled by the memory interface that all access the same row, some of those transactions will only need corresponding CAS commands to be issued from the DRAM scheduler 260 in order to perform the required access, since the necessary RAS command will already have been issued in connection with a preceding transaction. In addition, if a subsequent transaction is also to access the same row, then no precharge command will be required for the current transaction.

Whilst in one embodiment all of the components shown in FIG. 3 may be provided externally to the interconnect circuit 30 (as shown schematically in FIG. 1), it will be appreciated that in certain embodiments one or more of the components of the DRAM memory controller 50 may be provided internally within the interconnect 30 as part of an interface block of the interconnect 30. For example, in one embodiment, all of the components other than the memory interface 250 may be provided within the interconnect 30, whilst only the memory interface 250 is provided externally to interface between the interconnect 30 and the DRAM 55. However, irrespective of exactly where the components illustrated in FIG. 3 physically reside within the data processing system, those components will be collectively referred to herein as the "memory controller" for the DRAM 55.

As mentioned earlier, one type of list maintained within the pending transaction buffer 230 is a QoS list, each QoS list consisting of a number of QoS list entries. Each QoS list entry takes the form schematically illustrated by the entity 300 of FIG. 4A. The terms used in FIG. 4A have the following meaning:

Ptr: Pointer to the next item in the QoS-ordered list for the specified bank

Bank: The bank targeted by the transaction stored in this entry

QoS: QoS value for the transaction stored in this entry pQoS: QoS value for the transaction stored in the entry pointed to by Ptr (the "next entry")

V: Entry is valid (i.e. contains a transaction that has not yet been processed)

L: Set to indicate that the entry contains the last (tail) transaction for the specified bank list F: Set to indicate that the entry contains the first (head) transaction for the specified bank list Further, the number identified by the box 305 in each entry 300 identifies the location where the details of the transaction are stored within the buffer 230.

Figure 4A:
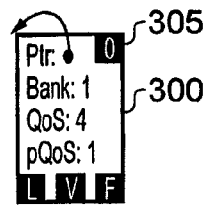
FIG. 4A schematically illustrates an entry for a priority based ordered list in accordance with one embodiment.
Figure 4B:
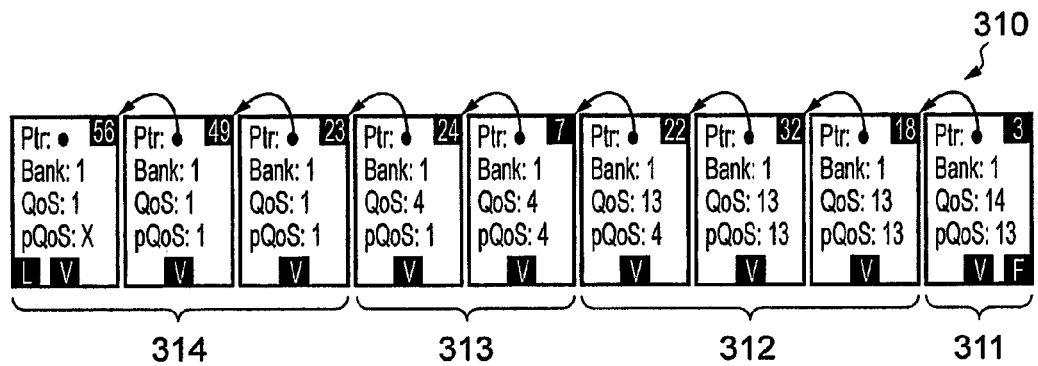
FIG. 4B schematically illustrates a plurality of such entries ordered so as to form a priority based ordered list.

An example populated QoS list for bank 1 may accordingly take the form illustrated schematically by the list 310 of FIG. 4B. As can be seen from FIG. 4B, the QoS list 310 can be considered to be formed of a number of sub-lists 311, 312, 313, 314. Within each sub-list, each entry has the same QoS indication and the relative ordering of the entries within each sub-list is dependent on the temporal order of receipt of those transactions by the interface 200 of the memory controller 50. As shown in FIG. 4B, the one and only entry in the sub-list 311 has its first flag set to indicate that it is the head transaction for the QoS list 310, and similarly the last transaction in the sub-list 314 has its last field set to indicate that it is the tail transaction for the particular QoS list.

Figure 5A:
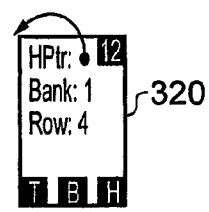
FIG. 5A schematically illustrates an entry for an access timing ordered list in accordance with one embodiment.

As also mentioned earlier, another type of ordered list maintained within the pending transaction buffer 230 is a row-hit list, each entry within a row-hit list in one embodiment taking the form of the entry 320 shown in FIG. 5A. The meaning of each of the terms used for the entry 320 of FIG. 5A is as follows:

HPtr: Hit pointer. Points to the next item in the row hit list (except in-burst hits, as will be discussed later)

Bank: The bank targeted by the transaction stored in this entry

Row: The row targeted by the transaction stored in this entry

Figure 5B:
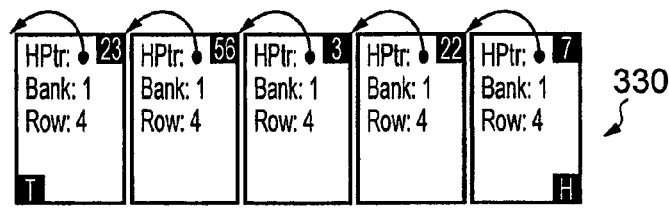
FIG. 5B schematically illustrates a plurality of such entries ordered so as to form an access timing ordered list.

T: Set to indicate that the entry contains the tail transaction for the specified row-hit list H: Set to indicate that the entry contains the head transaction for the specified row-hit list IB: Set to indicate that the entry contains an in-burst row-hit rather than a regular row-hit When a new pending transaction is allocated into the pending transaction buffer 230, if there is already a stored transaction with a matching bank/row that is marked as a row-hit list tail, then an entry for the new transaction is pushed on to that list to form a new tail. Otherwise, an entry is allocated to form a new row-hit list. An example of a populated row-hit list for bank 1, row 4 may hence take the form schematically illustrated in FIG. 5B as the list 330.

Figure 6:
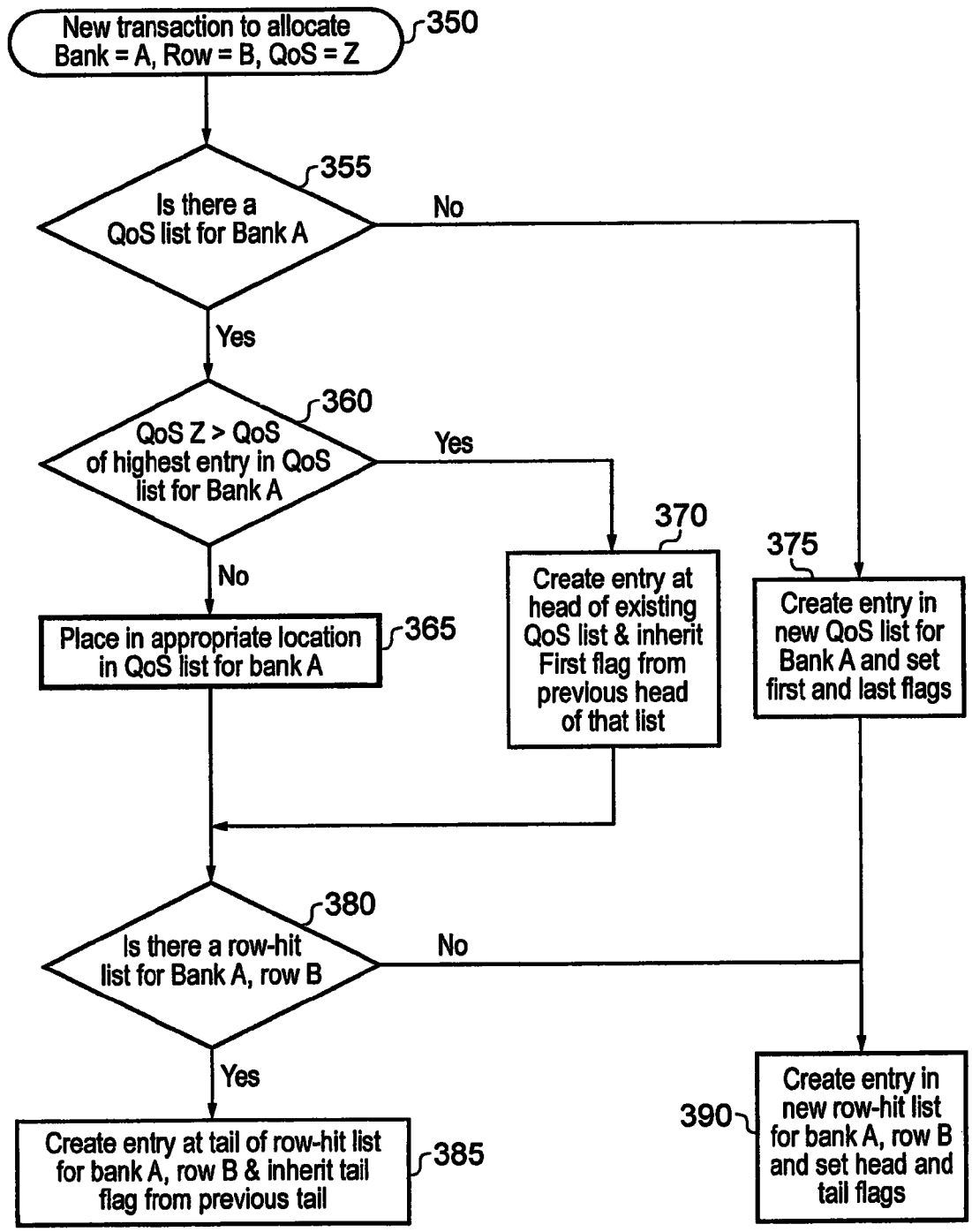
FIG. 6 is a flow diagram illustrating the steps performed by the list allocation circuitry of FIG. 3 in accordance with one embodiment.

FIG. 6 is a flow diagram illustrating the operation of the list allocation circuitry 220 of FIG. 3 in accordance with one embodiment, in this embodiment it being assumed that the in-burst row-hit field IB is not used. At step 350, the list allocation circuitry 220 receives a new transaction to allocate, that transaction being directed to bank A, row B, and having a QoS value of Z. At step 355, it is determined whether there is already a QoS list for bank A, i.e. whether there are any other pending transactions directed to bank A. If not, then the process proceeds to step 375 where an entry is created in a new QoS list for bank A, and the first and last flags of that entry are both set. If there was not a QoS list for bank A, then it will also be the case that there will not be a row-hit list for bank A, row B, and accordingly if step 375 is performed, the process also performs step 390, where an entry is created in a row-hit list for bank A, row B, with both the head and tail flags of that entry being set.

Assuming at step 355 it is determined that a QoS list does exist for bank A, then at step 360 it is determined whether the QoS value Z for the current transaction is greater than the QoS value of the highest priority entry in the QoS list for bank A, i.e. the entry having its first field set. If it is, then this indicates that the new transaction should be added to the head position of the QoS list, and accordingly the process proceeds to step 370 where an entry is created at the head of the existing QoS list, with that entry inheriting the first flag from the previous head of that QoS list. However, assuming the QoS value Z is not greater than the QoS value of the highest priority entry in the QoS list for bank A, then the process proceeds to step 365, where an entry is created and placed in an appropriate location within the QoS list for bank A. One way of performing step 365 of FIG. 6 will be described later with reference to FIG. 7.

Following either step 365 or step 370, it is determined at step 380 if there is a row-hit list for bank A and row B. If not, the process branches to step 390, but assuming there is a row-hit list already available for bank A, row B, then the process proceeds to step 385 where a new entry is created at the tail of that row-hit list, with that entry inheriting the tail flag from the previous tail entry.

Figure 7:
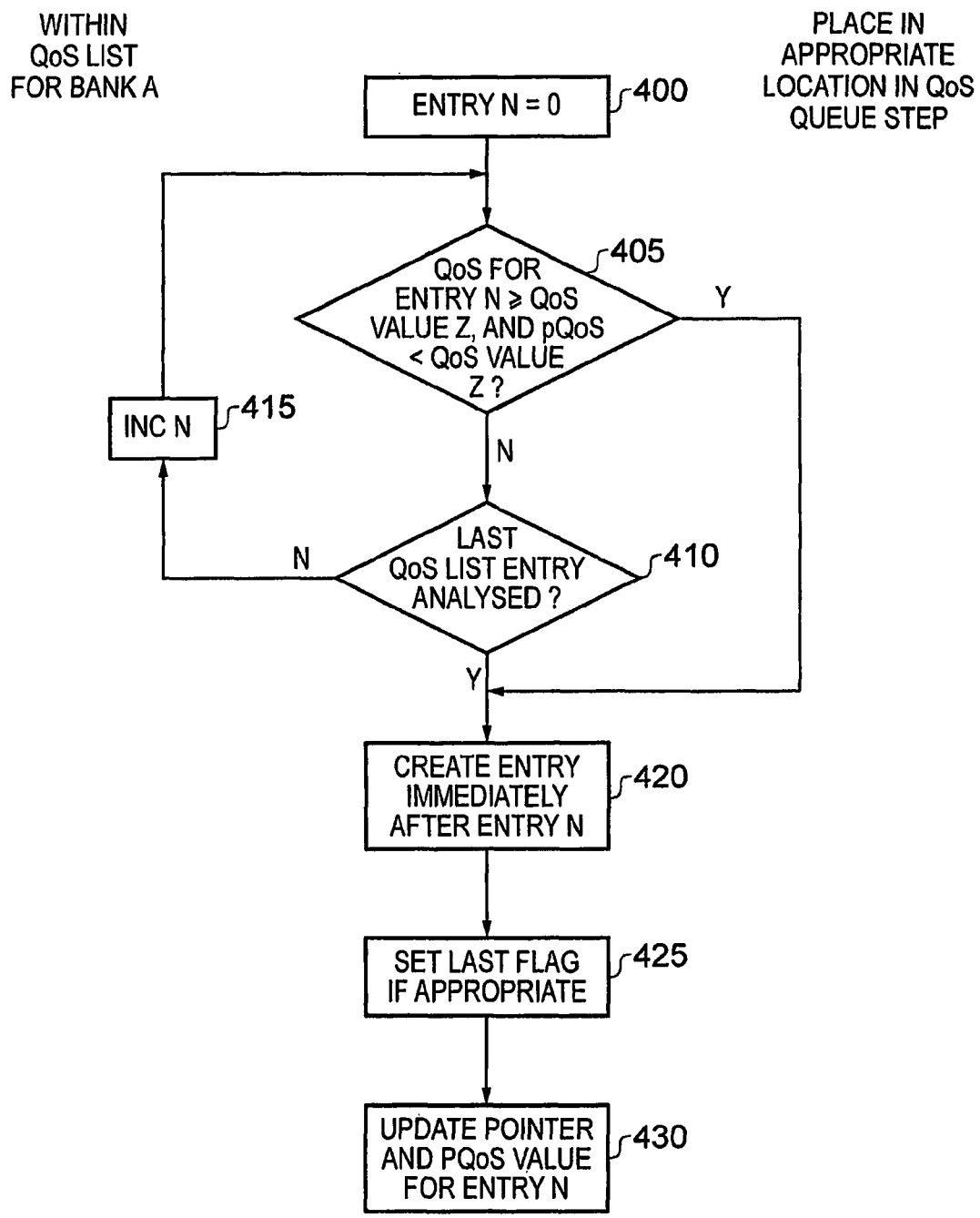
FIG. 7 is a flow diagram illustrating a sequence of steps performed in one embodiment in order to implement step 365 of FIG. 6.

FIG. 7 is a flow diagram illustrating a series of steps that can be used to implement step 365 of FIG. 6 in accordance with one embodiment. At step 400, the parameter N is set equal to zero, whereafter at step 405 it is determined whether the QoS level for entry N is greater than or equal to the QoS value Z, and in addition whether the pQoS value identified in entry N is less than the QoS value Z. If it is not, then it is determined at step 410 whether the last QoS list entry has been analysed, and if not the parameter N is incremented at step 415, and the process returns to step 405. When, for a particular entry, it is determined that the condition set out in step 405 is met, the process proceeds to step 420, where an entry is created immediately after entry N within the QoS list. To enable the condition of step 405 to always be met for one entry in the list, a final entry in the list can have a pQoS value set to some predetermined value which is always considered to be less than the QoS value Z. For example, with reference to FIG. 4B, such a predetermined level is indicated by the symbol "X" in the tail entry of the QoS list.

In addition to creating the entry at step 420, the last flag is set if appropriate at step 425 (typically this can be done by inheriting the last flag from entry N) and in addition at step 430 the pointer and pQoS value for entry N is updated.

Figure 8:
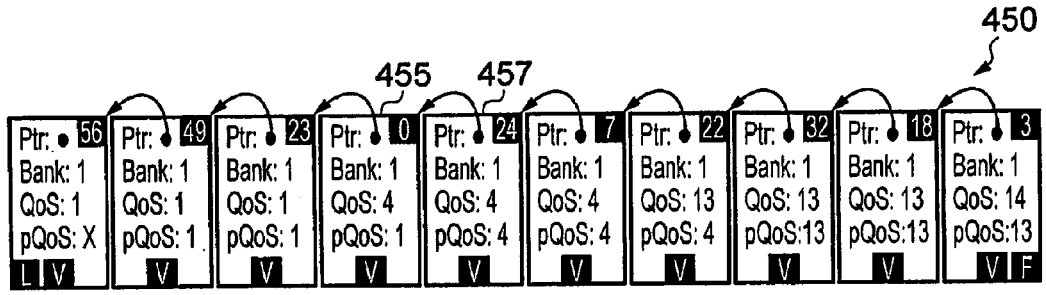
FIG. 8 schematically illustrates how a new entry is inserted into an existing priority based ordered list in accordance with the technique of FIG. 7.

This process is illustrated schematically in FIG. 8, where the entry shown in FIG. 4A is inserted within the QoS list 310 of FIG. 4B as a new entry 455 in order to create the modified QoS list 450. In particular, the QoS value Z of the new transaction to be allocated is in this case "4" and entry 457 is hence identified as the entry N meeting the condition of step 405 of FIG. 7, since it initially had a QoS value of 4 and a pQoS value of 1 (as is evident from the corresponding entry in the QoS list 310 of FIG. 4B). Accordingly, a new entry 455 is allocated which inherits the original pointer value from the entry 457, whilst the entry 457 is modified so as to point to the new entry 455. In addition, the pQoS value stored in entry 457 is updated from "1" to "4" to correctly identify the QoS value of the next entry 455. Since the new entry 455 is not the final entry in the QoS list, its last flag is not set.

Whilst the embodiment described above with reference to FIGS. 7 and 8 discusses one suitable mechanism for performing step 365 of FIG. 6, where each entry maintains both QoS and pQoS values to simplify and speed up the allocation process, it will be appreciated that other techniques could be used if desired. For example, a table walk process could be used if desired.

Figure 9:
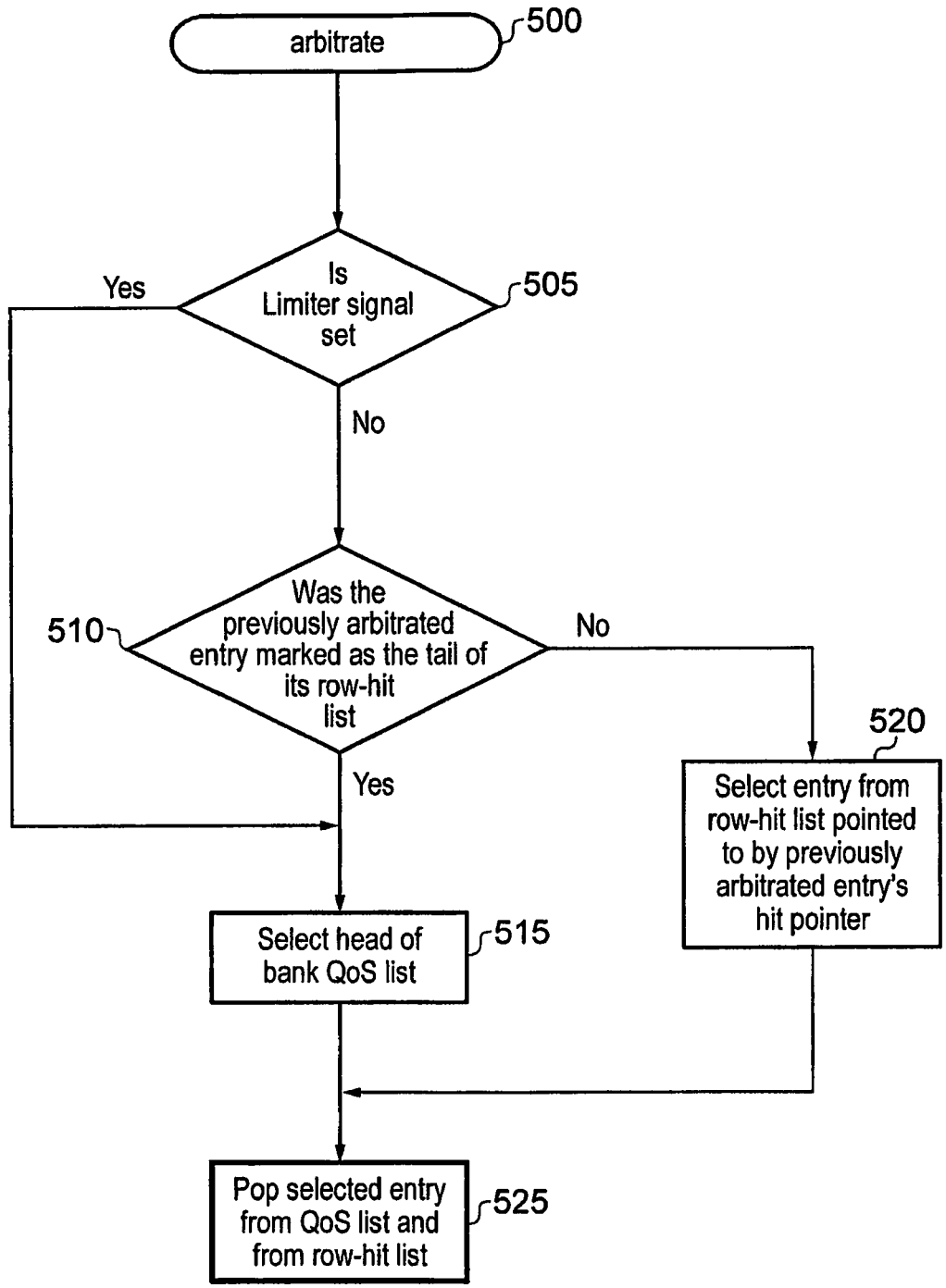
FIG. 9 is a flow diagram illustrating the steps performed by the arbitration circuitry of FIG. 3 in accordance with one embodiment.

FIG. 9 is a flow diagram illustrating an arbitration operation performed by the arbitration circuitry 240 of FIG. 3 in accordance with one embodiment. When a new transaction needs to be selected for passing to the memory interface 250, the arbitration operation starts at step 500, whereafter at step 505 it is determined whether a limiter signal has been set. This signal will be discussed in more detail later with reference to FIGS. 10A to 10C. However, unless that limiter signal is set, the process proceeds to step 510, where it is determined whether the previously arbitrated entry (i.e. the entry corresponding to the previous winning request last time the arbitration operation was performed) was marked as the tail of its row-hit list. If not, this indicates that the relevant row-hit list is not yet empty, and accordingly the process branches to step 520 where the entry selected by the arbitration operation is that entry in the row-hit list pointed to by the previously arbitrated entry's hit pointer.

However, if it is determined at step 510 that the previously arbitrated entry was marked as the tail of its row-hit list, then the process proceeds to step 515 where the entry at the head of the relevant bank QoS list is selected as the next winning entry. With regard to the relevant bank, the memory interface 250 will typically identify to the arbitration circuitry 240 the bank for which it is able to receive a new transaction. Hence, there will typically only be a single QoS list to be considered at step 515.

Following step 515 or step 520, the process proceeds to step 525 where the selected entry is popped from the QoS list and from the row-hit list, this process being described later with reference to FIGS. 11A and 11B.

Figure 10A:
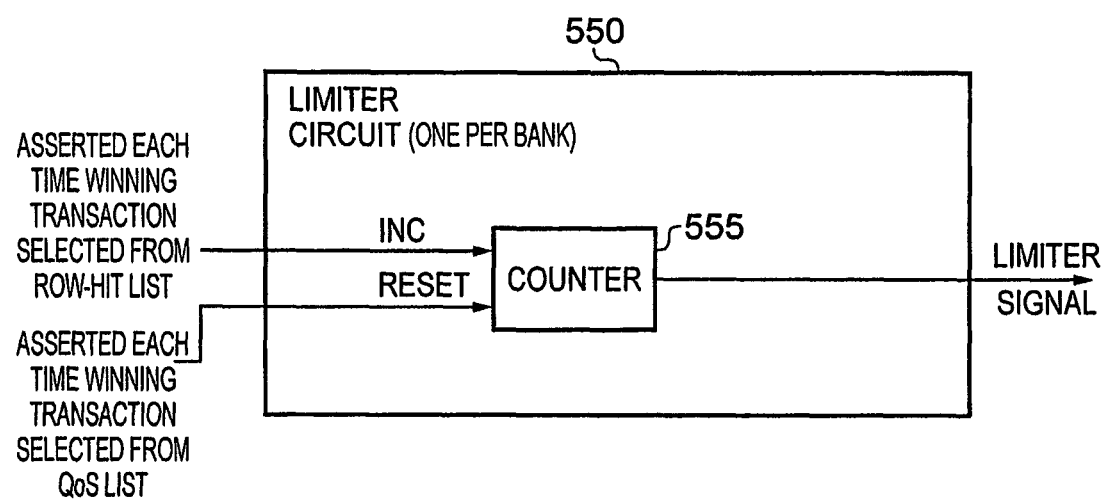
FIG. 10A schematically illustrates the operation of a limiter circuit in accordance with one embodiment.

FIG. 10A schematically illustrates an example of a limiter circuit 550 which may be used in one embodiment. In one particular embodiment, the limiter circuitry is provided separately for each bank, and can be considered to form part of the arbitration circuitry 240. Each limiter circuit includes a counter 555 which is incremented each time a winning transaction for the associated bank is selected from a row-hit list. Further, the counter is reset each time a winning transaction is selected from the QoS list for that bank. If the count value maintained by the counter 555 reaches a predetermined threshold value, then the limiter signal is set. With reference to step 505 of FIG. 9, it will be appreciated that when the limiter signal is set, this will cause the process to proceed directly to step 515, such that the next winning transaction is selected from the QoS list rather than the row-hit list, even if the last winning transaction was from a row-hit list entry which was not at the tail position. By such an approach, it can be ensured that even in the presence of a large number of pending transactions to a particular row in a particular bank, the QoS level of other transactions is still taken into account, thus ensuring that a high priority transaction is not delayed to an unacceptable degree in the presence of a large number of pending transactions to a particular row.

Figure 10B:
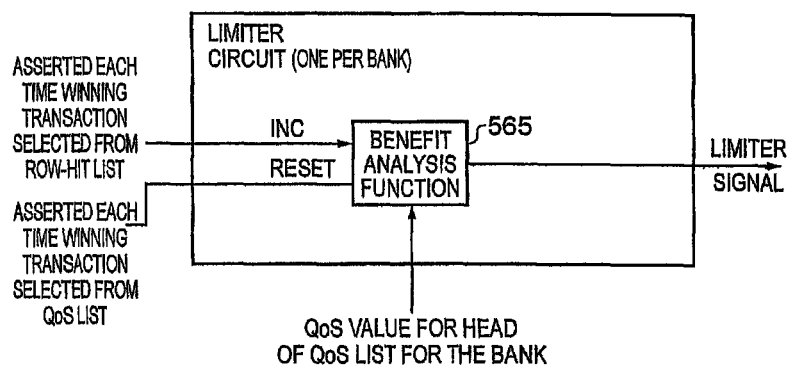
FIGS. 10B and 10C schematically illustrate the operation of a limiter circuit in accordance with an alternative embodiment.
Figure 10C:
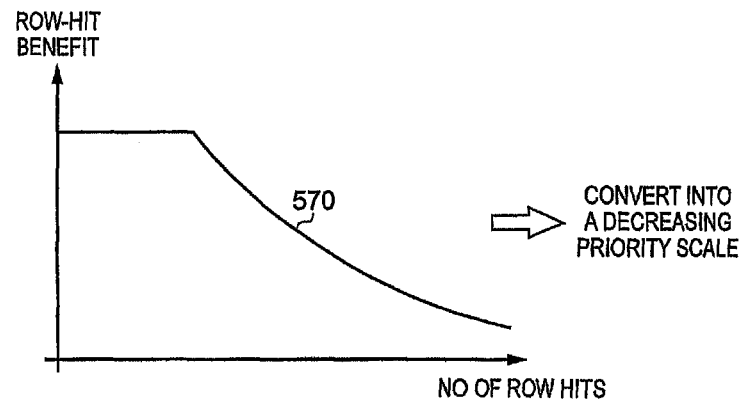

FIG. 10B illustrates an alternative example of limiter circuit where, instead of a simple counter, circuitry to perform some benefit analysis function 565 is used. In addition to the signals received by the counter 555 of FIG. 10A, the benefit analysis function 565 receives an indication of the QoS value associated with the head entry of the QoS list for the relevant bank. Due to the nature of DRAM memory, a graph such as FIG. 10C can be formed identifying the row-hit benefit of consecutive accesses to memory addresses in a particular row. Initially the row-hit benefit is very large, since there is a need to activate a row before it can be accessed, and there is also typically a predetermined delay required before that row can be precharged again. Hence, during that period, the graph takes the horizontal form shown in FIG. 10C. However, after that initial period, the benefit slowly drops away as indicated by the curved graph 570, due to the overhead amortized across the multiple accesses within a particular row. Accordingly, the graph of FIG. 10C can be converted into a decreasing priority scale associated with continued accesses to a particular row, i.e. as the number of consecutive accesses increases, the effective QoS value associated with those accesses decreases. Accordingly, at some point, that pseudo-QoS value will fall to a level less than the QoS value associated with the head of the QoS list, and at that point the limiter signal can be set to cause the next winning transaction to be selected from the head of the bank QoS list instead of from the row-hit list.

Figure 11A:
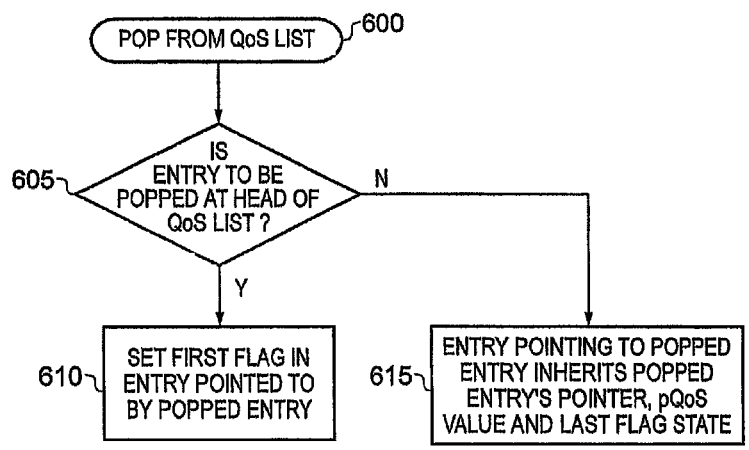
FIGS. 11A and 11B illustrate the steps performed when popping an entry from a priority based ordered list and from an access timing ordered list, respectively, in accordance with one embodiment.

FIG. 11A is a flow diagram illustrating the steps performed at step 525 of FIG. 9 in order to pop an entry from the QoS list. When it is determined at step 600 that such an entry needs to be popped, the process proceeds to step 605, where it is determined whether the entry to be popped is at the head of the QoS list. This will clearly be the case if step 525 of FIG. 9 has been reached as a result of executing step 515 of FIG. 9, but will not necessarily be the case if step 525 has been reached via step 520 of FIG. 9. In particular, when an entry is selected from the row-hit list, its corresponding entry in the bank QoS list can be at any location within that bank QoS list.

If it is determined at step 605 that the entry to be popped is at the head of the QoS list, then the process proceeds to step 610, where the first flag in the entry pointed to by the popped entry is set. In addition, the valid flag for the entry being popped is cleared to indicate that entry is no longer valid. If the entry to be popped is not at the head of the QoS list, then the process proceeds to step 615 where the entry pointing to the popped entry inherits the popped entry's pointer, the popped entry's pQoS value and the popped entry's last flag state. Again, the valid flag of the entry being popped is cleared to indicate that that entry is no longer valid.

Figure 12:
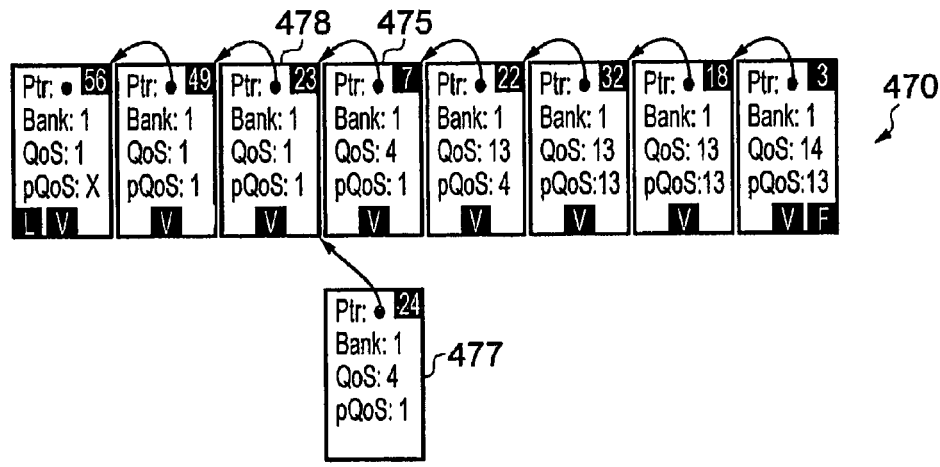
FIG. 12 schematically illustrates how an entry is popped from a priority based ordered list in accordance with the process of FIG. 11A.

The process performed at step 615 is illustrated schematically in FIG. 12 where the entry 477 in the QoS list 470 is popped, as a result of which the entry 475 that previously pointed to the entry 477 has its pointer updated to point to the entry 478, and has its pQoS value updated to reflect the QoS value of the entry 478. Since the popped entry 477 did not have its last flag set, the entry 475 also does not have its last entry set.

Figure 11B:
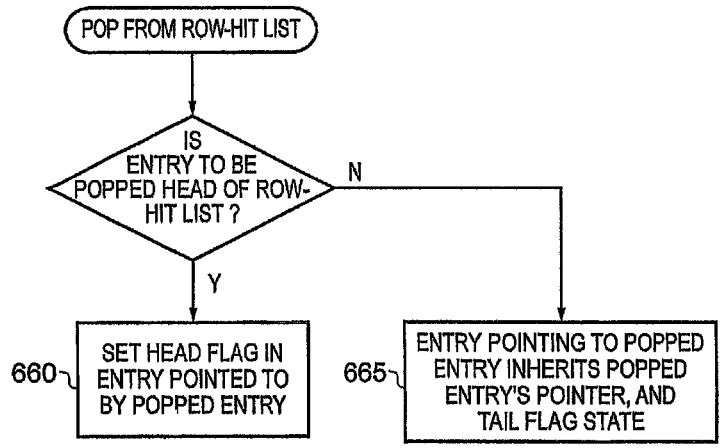

FIG. 11B illustrates the corresponding steps performed when popping an entry from the row-hit list. As will be seen from a comparison of FIG. 11B with the FIG. 11A, the process is generally the same. If the entry to be popped is at the head of the row-hit list, then at step 660 the head flag in the entry pointed to by the popped entry is set. If however the entry to be popped is not at the head of the row-hit list, then at step 665 the entry pointing to the popped entry inherits the popped entry's pointer and tail flag state.

Figure 13:
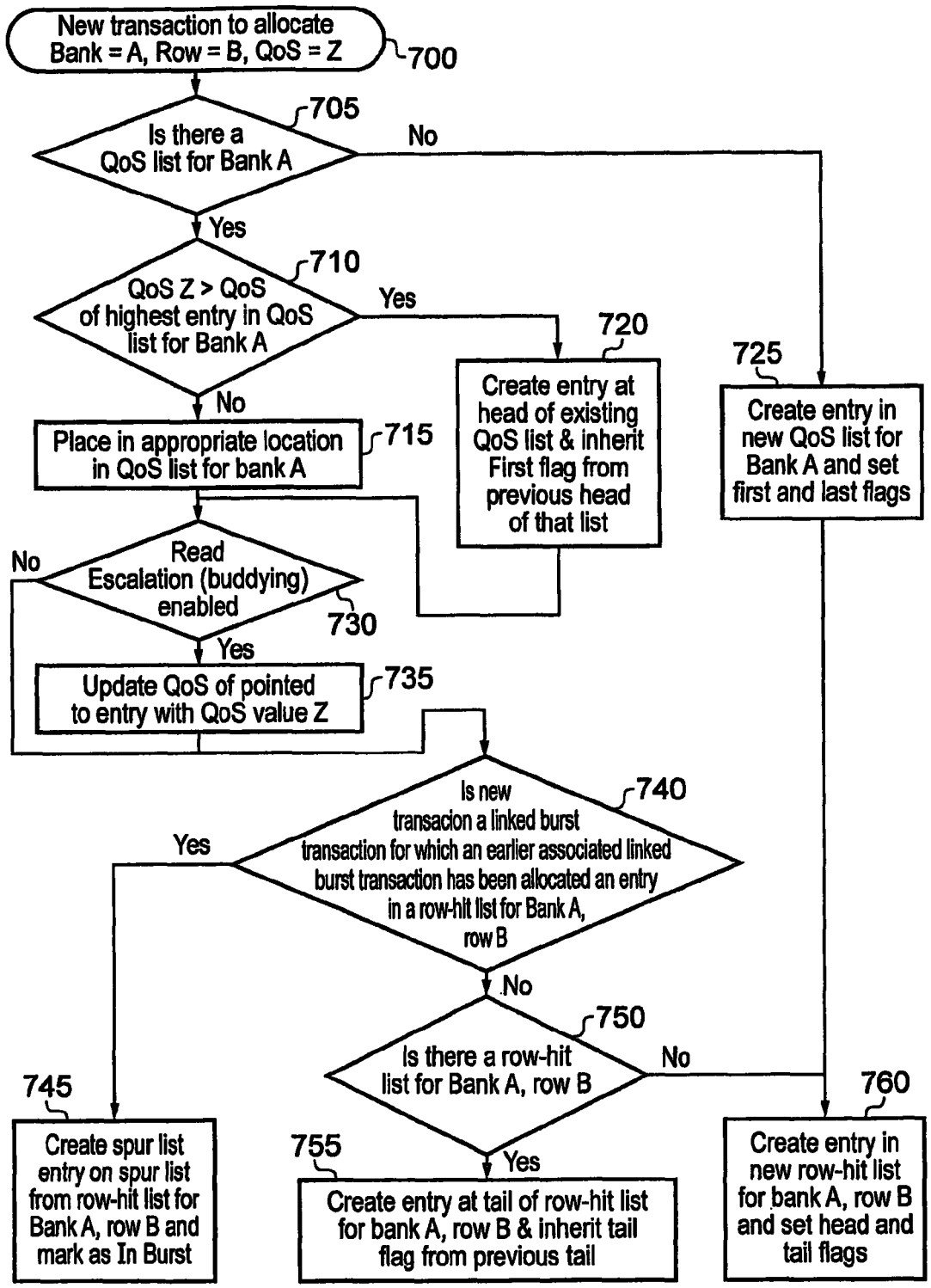
FIG. 13 is a flow diagram illustrating the steps performed by the list allocation circuitry of FIG. 3 in accordance with an alternative embodiment.

FIG. 13 is a flow diagram illustrating the steps performed by the list allocation circuitry 220 of FIG. 3 in accordance with an alternative embodiment. By comparison of FIG. 13 with the earlier-described FIG. 6, it will be appreciated that steps 700 to 725 and 750 to 760 of FIG. 13 correspond with steps 350 to 375 and 380 to 390 of FIG. 6, respectively, and accordingly these steps will not be discussed further. However, in the flow diagram of FIG. 13, four additional steps are performed, namely steps 730 to 745.

Figure 14:
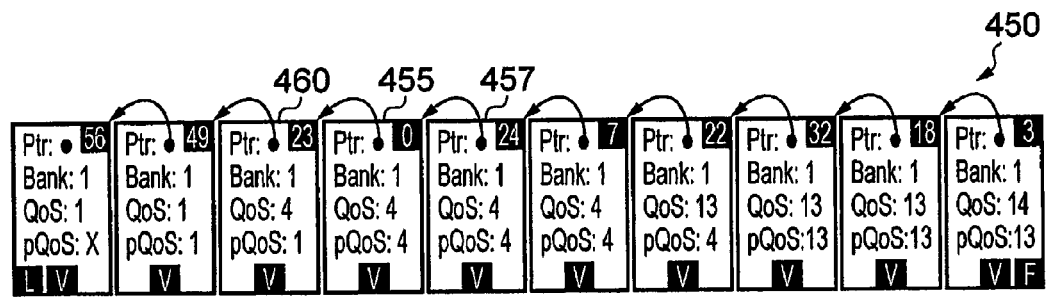
FIG. 14 schematically illustrates how the read escalation steps 730 and 735 of FIG. 13 affect the entries of a priority based ordered list in accordance with one embodiment.

In particular, in FIG. 13, the QoS lists include a read escalation feature which can be enabled or disabled, this read escalation feature also being referred to herein as a buddying scheme. If the read escalation feature is not enabled, then the process proceeds to step 740. However, if the read escalation function is enabled, then the process proceeds to step 735 where the QoS value of the pointed to entry is elevated to be equal to the QoS value Z. This is illustrated schematically in FIG. 14, which shows the same allocation as discussed earlier with reference to FIG. 8, but additionally shows the effect of the read escalation functionality. In particular, when the new entry 455 is introduced, the QoS value for the next entry 460 is increased to be equal to the QoS value of the new entry, i.e. indicating a QoS value of 4. As a result, the pQoS value identified within the inserted entry 455 now takes on the value 4. Otherwise, the process is exactly as discussed earlier with reference to FIG. 8. The benefit of such an approach is that the entry 460 has its priority elevated when a new entry is inserted ahead of it in the QoS list, and as a result this can prevent indefinite blocking of lower priority transactions, thus allowing for predictable latency calculations. Whilst in the embodiment discussed in FIG. 13 the QoS value of the pointed to entry is updated to be equal to the QoS value Z, it will be appreciated that this is not a requirement, and in an alternative embodiment of the read escalation scheme, it may be sufficient merely to increase the QoS value of the pointed to entry by some predetermined amount.

Figure 15:
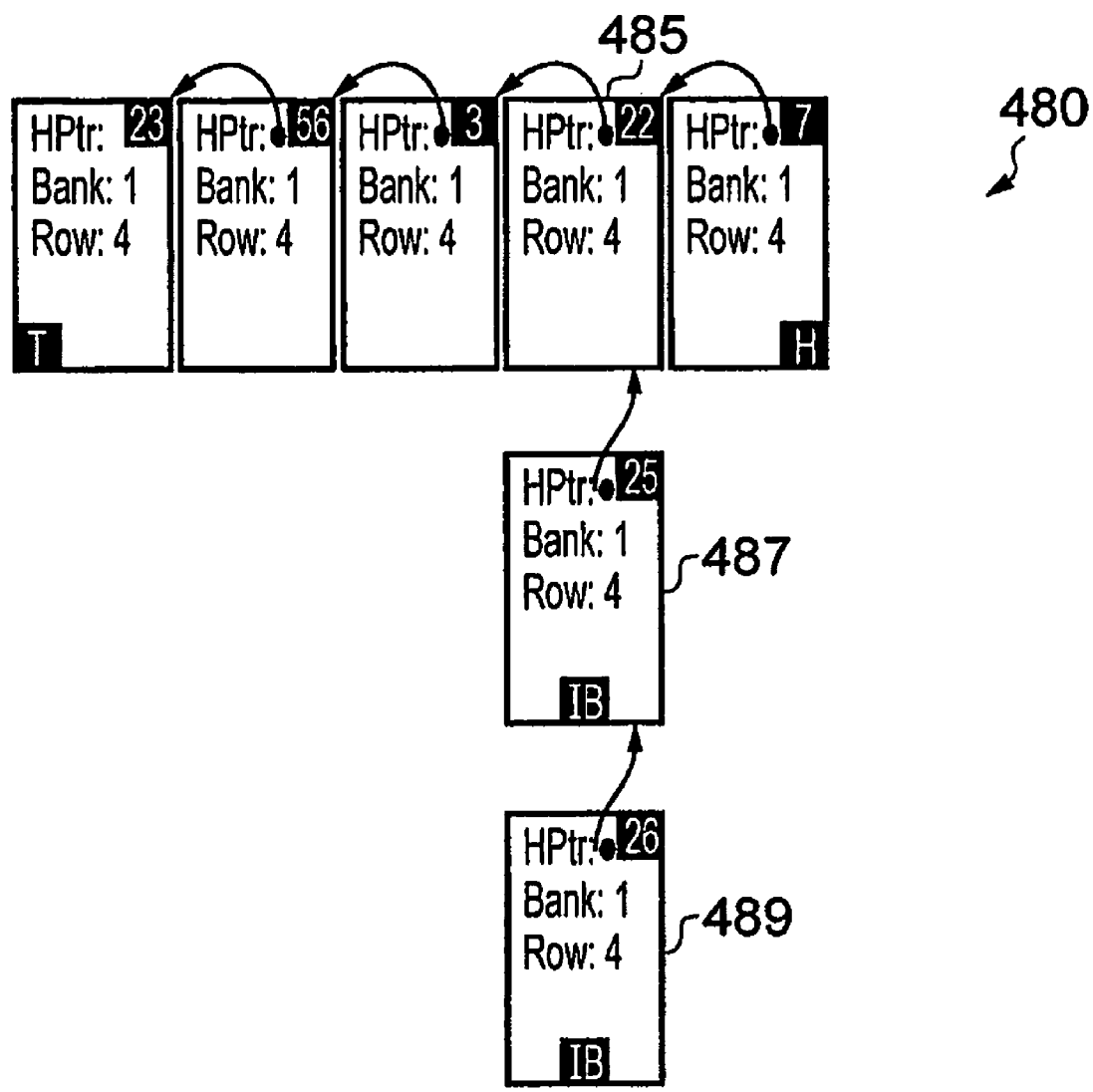
FIG. 15 schematically illustrates how steps 740 and 745 of FIG. 13 can cause a spur list to be generated from an access timing ordered list in accordance with one embodiment.

Steps 740 and 745 deal with the linked burst transactions mentioned earlier. In particular, in one embodiment the row-hit lists can be arranged to support one or more spur-lists, each spur-list having a number of spur-list entries identifying linked burst transactions. Hence, at step 740 it is determined whether the new transaction to be allocated is a linked burst transaction for which an earlier associated linked burst transaction has already been allocated an entry in a row-hit list for bank A, row B. If it has, then the process proceeds to step 745, where a spur list entry is created on a spur list from the row-hit list for bank A, row B, and that entry is marked as "in-burst" by having the IB flag set. This is illustrated schematically in FIG. 15, for the row-hit list 480. In particular, the first linked burst transaction is allocated the entry 485 within the row-hit list 480. However, each subsequent linked burst transaction is allocated a spur-list entry 487, 489 within the spur-list. Such spur-list entries can then be treated differently during arbitration, as will be discussed for example with reference to FIG. 16.

Figure 16:
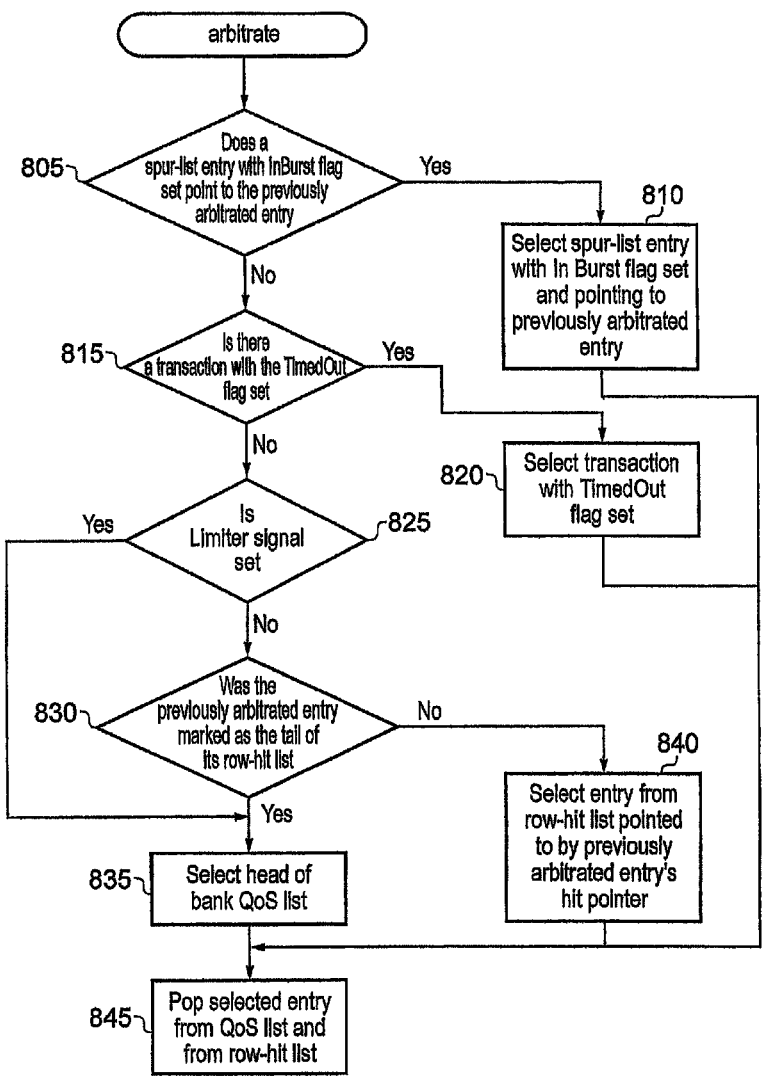
FIG. 16 is a flow diagram illustrating the steps performed by the arbitration circuitry of FIG. 3 in accordance with an alternative embodiment.

In particular, FIG. 16 illustrates an arbitration operation that may be performed by the arbitration circuitry 240 of FIG. 3 in accordance with an alternative embodiment. By comparison with the earlier-described FIG. 9, it will be appreciated that steps 825 to 845 correspond with steps 505 to 525 of FIG. 9, and accordingly will not be discussed further herein. However, prior to step 825, a number of further steps are performed. In particular, at step 805, it is determined whether a spur-list entry with its in-burst flag set points to the previously arbitrated entry. Hence, with reference to FIG. 15, if the previously arbitrated entry is the entry 485, this will be the case as the entry 487 points to it. Similarly, if the previously arbitrated entry was the entry 487, this will also be the case as the entry 489 points to the entry 487.

Whenever this condition is met, the process branches to step 810, where a spur-list entry with its in-burst flag set is selected to identify the winning transaction, and thereafter at step 845 that selected entry is popped from the row-hit list (and its corresponding entry is popped from the relevant QoS list).

However, assuming there is not such a spur-list entry identified at step 805, the process proceeds to step 815 where it is determined whether there is a transaction with its TimedOut flag set. In particular, in this embodiment, the TimedOut flag is used as an example of a predetermined exception condition, and when the TimedOut flag is set to identify the presence of a predetermined exception condition, the normal arbitration process is not performed, and instead the process branches to step 820. The TimedOut flag can be set for a variety of reasons. However, in one embodiment, elements elsewhere in the data processing system may identify that a particular transaction needs handling as soon as practical, either because the upper limit on latency for that transaction is being reached, or because various other transactions cannot proceed until that transaction has been handled, etc. Accordingly, those elements will issue control signals which will cause the priority of that transaction to be elevated, causing a TimedOut flag to be set within the memory controller for that particular transaction. There are a number of places where such a TimedOut flag may be maintained. However, in one embodiment, that TimedOut flag is maintained in association with the details of each pending transaction within the pending transaction buffer 230.

If the TimedOut flag is set for any transaction, then the process proceeds to step 820, where a transaction with its TimedOut flag set is selected. If there are multiple transactions with the TimedOut flag set, then the winning transaction can be selected using any appropriate selection technique at step 820, for example by randomly choosing amongst the transactions whose TimedOut flag is set. However, typically there is an expectation that there will generally not be multiple transactions whose TimedOut flag is set, as this would indicate that the QoS values associated with the transactions were not being prioritised appropriately by the memory controller 50. In that case, it would be appropriate to reduce the requirement for the limiter signal to be set, so that the branch from step 825 to step 835 occurs more frequently, thereby reducing the prospect of the transaction having its TimedOut flag set.

In accordance with the above described techniques, the memory controller performs list allocation and arbitration operations that allow significant reordering of transactions to improve the incidence of row hits, whilst at the same time preserving the temporal order of transactions within their priority levels. This can hence enable a balance to be struck between the reordering of transactions to reduce access latency, whilst maintaining QoS requirements of transactions at the system level.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. A memory controller for controlling access to a memory device, the memory device comprising a plurality of banks with each bank comprising a plurality of rows, and the memory device having a non-uniform access timing characteristic such that a time taken to access a memory address is dependent on preceding access activity within the memory device, the memory controller comprising:

an interface configured to receive transactions issued from at least one transaction source, each transaction specifying the memory address to be accessed for that transaction and including a priority indication associated with that transaction;

a storage configured to temporarily store as pending transactions those transactions received by the interface that have not yet been issued by the memory controller to the memory device, the storage maintaining a plurality of ordered lists for the stored pending transactions, including at least one priority based ordered list and at least one access timing ordered list, said at least one priority based ordered list comprising a separate priority based ordered list for each bank of the memory device for which there is a pending transaction, and said at least one access timing ordered list comprising a separate access timing ordered list for each row of each bank for which there is a pending transaction;

each priority based ordered list having a number of entries, each entry being associated with one of said pending transactions, and each entry being ordered within its priority based ordered list based on the priority indication of the associated pending transaction, each priority based ordered list comprising a number of sub-lists, each entry being in one sub-list such that the entries of each sub-list relate to transactions having the same priority indication, the sub-lists being ordered within their priority based ordered list based on the priority indication, and within each sub-list the entries of that sub-list being ordered based on temporal order of receipt of the associated pending transactions by said interface;

each access timing ordered list having a number of entries, each entry being associated with one of said pending transactions, and the pending transactions associated with each access timing ordered list forming a group of transactions whose memory addresses can be efficiently accessed by the memory device having regard to the non-uniform access timing characteristic once the memory address of one transaction in said group has been accessed; and arbitration circuitry configured to perform an arbitration operation during which said plurality of ordered lists are referenced so as to select from said pending transactions a winning transaction to be issued to said memory device, the storage being arranged to remove any entry for the winning transaction from the plurality of ordered lists;

if when the arbitration operation is performed, the winning transaction selected last time the arbitration operation was performed had an entry in one of said at least one access timing ordered lists, and that at least one access timing ordered list is still non-empty, the arbitration operation is arranged, unless a predetermined exception condition exists, to select as the winning transaction one of the pending transactions having an entry in that at least one access timing ordered list; and wherein if the winning transaction selected last time the arbitration operation was performed did not have an entry in one of said at least one access timing ordered lists, or did have an entry in one of said at least one access timing ordered lists but that at least one access timing order list is now empty, the arbitration operation is arranged to select as the winning transaction the pending transaction having an entry at a head position within one of said at least one priority based ordered lists.

2. A memory controller as claimed in claim 1, wherein within each access timing ordered list the entries are ordered based on temporal order of receipt of the associated pending transactions by said interface.

3. A memory controller as claimed in claim 1, wherein:
each row needs to be activated prior to that row being accessed, such that the access timing to a specified memory address varies dependent on whether the row containing that specified memory address has already been activated or not.

4. A memory controller as claimed in claim 1, further comprising allocation circuitry, responsive to each transaction received by said interface, to allocate an entry for that transaction in at least one of said plurality of ordered lists.

5. A memory controller as claimed in claim 4, wherein, for each transaction received by said interface, the allocation circuitry is configured to allocate entries for that transaction in both one of said at least one priority based ordered lists and one of said at least one access timing ordered lists.

6. A memory controller as claimed in claim 1, wherein:
within each priority based ordered list, each entry comprises a head indicator and a tail indicator, the head indicator being set if the entry is at a head position in the priority based ordered list and the tail indicator being set if the entry is at a tail position in the priority based ordered list; and
each entry further comprises a pointer to a next entry in the priority based ordered list, the next entry being at a position more remote from the head position than the entry whose pointer points to that next entry.

7. A memory controller as claimed in claim 6, wherein each entry further identifies the priority indication of the associated pending transaction.

8. A memory controller as claimed in claim 7, wherein each entry further identifies the priority indication of the pending transaction associated with said next entry.

9. A memory controller as claimed in claim 8, further comprising:
allocation circuitry, responsive to a current transaction received by said interface, to allocate an entry for said current transaction in a chosen one of said at least one priority based ordered lists chosen having regard to the memory address specified by the current transaction;
the allocation circuitry being configured to identify an entry in the chosen priority based ordered list whose priority indication for the associated pending transaction is greater than or equal to the priority indication for the current transaction, and whose priority indication for the pending transaction associated with said next entry is less than the priority indication for the current transaction; and
the allocation circuitry being further configured to add into the chosen priority based ordered list a new entry for the current transaction that is ordered so as to be adjacent to said identified entry but more remote from the head position than said identified entry.

10. A memory controller as claimed in claim 9, wherein the pointer for the identified entry is updated to point to the new entry and the pointer for the new entry is arranged to point to said next entry.

11. A memory controller as claimed in claim 10, wherein within said next entry, the priority indication of the associated pending transaction is updated.

12. A memory controller as claimed in claim 11, wherein the priority indication of the associated pending transaction is updated to correspond to the priority indication of the current transaction associated with the new entry.

13. A memory controller as claimed in claim 9, wherein if the new entry is at the tail position in the priority based ordered list, the allocation circuitry causes the tail indicator for the new entry to be set and the tail indicator for the entry previously at the tail position to be cleared.

14. A memory controller as claimed in claim 9, wherein if there is no entry in the chosen priority based ordered list whose priority indication for the associated pending transaction is greater than or equal to the priority indication for the current transaction, the allocation circuitry is configured to add the new entry for the current transaction at the head position, the head indicator for the new entry being set and the pointer for the new entry being arranged to point to the entry that was previously at the head position, and the entry previously at the head position having its head indicator cleared.

15. A memory controller as claimed in claim 9, wherein if the chosen priority based ordered list currently has no entries, the allocation circuitry is arranged to cause the new entry allocated for the current transaction to have both its head indicator and its tail indicator set.

16. A memory controller as claimed in claim 1, wherein:
within each access timing ordered list, each entry comprises a head indicator and a tail indicator, the head indicator being set if the entry is at a head position in the access timing ordered list and the tail indicator being set if the entry is at a tail position in the access timing ordered list; and
each entry further comprises a pointer to a next entry in the access timing ordered list, the next entry being at a position more remote from the head position than the entry whose pointer points to that next entry.

17. A memory controller as claimed in claim 16, wherein a burst transaction issued by said at least one transaction source is converted into a plurality of linked burst transactions for said memory device, the memory controller further comprising:
allocation circuitry arranged to allocate a first of said linked burst transactions to an entry in one of said at least one access timing ordered lists, and then to allocate all of the remaining linked transactions to spur-list entries of a spur-list associated with said entry.

18. A memory controller as claimed in claim 17, wherein if when the arbitration operation is performed, the winning transaction selected last time the arbitration operation was performed had an entry in one of said at least one access timing ordered lists, and that entry has said spur-list associated with it, the arbitration operation is arranged to select as the winning transaction one of the linked transactions having a spur-list entry in said spur-list.

19. A memory controller as claimed in claim 18, wherein only when all of the linked transactions have been selected as winning requests is the arbitration operation arranged to select as a subsequent winning transaction the transaction associated with said next entry in said one of said at least one access timing ordered lists.

20. A memory controller as claimed in claim 16, wherein:
the memory device comprises a plurality of banks, each bank comprises a plurality of rows, and said at least one access timing ordered list comprises a separate access timing ordered list for each row of each bank for which there is a pending transaction;
within each access timing ordered list, each entry comprising an indication of the bank and row for which the access timing ordered list is provided.

21. A memory controller as claimed in claim 1, wherein said priority indication is an explicit priority indication provided within a field of each transaction.

22. A memory controller as claimed in claim 21, wherein said priority indication is a quality of service (QoS) level indication.

23. A memory controller as claimed in claim 1, wherein said predetermined exception condition is a condition causing the priority indication of a particular pending transaction to be changed to represent a high priority, the arbitration circuitry being configured, in the presence of said predetermined exception condition, to select as the winning transaction said particular pending transaction, and the storage being arranged to remove any entry for that winning transaction from the plurality of ordered lists.

24. A memory controller as claimed in claim 1, further comprising:
limiter circuitry configured to monitor at least the number of consecutive winning transactions selected from one of said access timing ordered lists, and to assert a limiter signal on occurrence of a threshold condition;
said predetermined exception condition being detected if said limiter signal is asserted, and the arbitration circuitry being responsive to assertion of the limiter signal to cause a next performance of the arbitration operation to select as the winning transaction the pending transaction having an entry at a head position within one of said at least one priority based ordered lists, even if the winning transaction selected last time the arbitration operation was performed had an entry in one of said at least one access timing ordered lists, and that at least one access timing ordered list is still non-empty.

25. A memory controller as claimed in claim 1, wherein the transactions received by said interface are read transactions.

26. A memory controller as claimed in claim 1, wherein the arbitration circuitry is configured to perform multiple arbitration operations in parallel.

27. A method of controlling access to a memory device, the memory device comprising a plurality of banks with each bank comprising a plurality of rows, and the memory device having a non-uniform access timing characteristic such that a time taken to access a memory address is dependent on preceding access activity within the memory device, the method comprising:
receiving transactions issued from at least one transaction source, each transaction specifying the memory address to be accessed for that transaction and including a priority indication associated with that transaction;
temporarily storing in a storage, as pending transactions, those received transactions that have not yet been output from an output interface to the memory device, the storage maintaining a plurality of ordered lists for the stored pending transactions, including at least one priority based ordered list and at least one access timing ordered list, said at least one priority based ordered list comprising a separate priority based ordered list for each bank of the memory device for which there is a pending transaction, and said at least one access timing ordered list comprising a separate access timing ordered list for each row of each bank for which there is a pending transaction;
arranging each priority based ordered list to have a number of entries, each entry being associated with one of said pending transactions, and each entry being ordered within its priority based ordered list based on the priority indication of the associated pending transaction, each priority based ordered list comprising a number of sub-lists, each entry being in one sub-list such that the entries of each sub-list relate to transactions having the same priority indication, the sub-lists being ordered within their priority based ordered list based on the priority indication, and within each sub-list the entries of that sub-list being ordered based on temporal order of receipt of the associated pending transactions by said interface;
arranging each access timing ordered list to have a number of entries, each entry being associated with one of said pending transactions, and the pending transactions associated with each access timing ordered list forming a group of transactions whose memory addresses can be efficiently accessed by the memory device having regard to the non-uniform access timing characteristic once the memory address of one transaction in said group has been accessed; and
performing an arbitration operation during which said plurality of ordered lists are referenced so as to select from said pending transactions a winning transaction to be output from said output interface to said memory device, and removing any entry for the winning transaction from the plurality of ordered lists;
if when the arbitration operation is performed, the winning transaction selected last time the arbitration operation was performed had an entry in one of said at least one access timing ordered lists, and that at least one access timing ordered list is still non-empty, the arbitration operation being arranged, unless a predetermined exception condition exists, to select as the winning transaction one of the pending transactions having an entry in that at least one access timing ordered; and
wherein if the winning transaction selected last time the arbitration operation was performed did not have an entry in one of said at least one access timing ordered lists, or did have an entry in one of said at least one access timing ordered lists but that at least one access timing ordered list is now empty, the arbitration operation is arranged to select as the winning transaction the pending transaction having an entry at a head position within one of said at least one priority based ordered lists.

28. A memory controller for controlling access to a memory device, the memory device comprising a plurality of banks with each bank comprising a plurality of rows, and the memory device having a non-uniform access timing characteristic such that a time taken to access a memory address is dependent on preceding access activity within the memory device, the memory controller comprising:
means for receiving transactions issued from at least one transaction source, each transaction specifying the memory address to be accessed for that transaction and including a priority indication associated with that transaction;
means for temporarily storing as pending transactions those transactions received by the means for receiving transactions that have not yet been issued by the memory controller to the memory device, the means for temporarily storing maintaining a plurality of ordered list means for the stored pending transactions, including at least one priority based ordered list and at least one access timing ordered list, said at least one priority based ordered list comprising a separate priority based ordered list for each bank of the memory device for which there is a pending transaction, and said at least one access timing ordered list comprising a separate access timing ordered list for each row of each bank for which there is a pending transaction;

each priority based ordered list having a number of entries, each entry being associated with one of said pending transactions, and each entry being ordered within its priority based ordered list based on the priority indication of the associated pending transaction, each priority based ordered list comprising a number of sub-lists, each entry being in one sub-list such that the entries of each sub-list relate to transactions having the same priority indication, the sub-lists being ordered within their priority based ordered list based on the priority indication, and within each sub-list the entries of that sub-list being ordered based on temporal order of receipt of the associated pending transactions by said means for receiving transactions;

each access timing ordered list having a number of entries, each entry being associated with one of said pending transactions, and the pending transactions associated with each access timing ordered list forming a group of transactions whose memory addresses can be efficiently accessed by the memory device having regard to the non-uniform access timing characteristic once the memory address of one transaction in said group has been accessed; and means for performing an arbitration operation during which said plurality of ordered list are referenced so as to select from said pending transactions a winning transaction to be issued to said memory device, the means for temporarily storing for removing any entry for the winning transaction from the plurality of ordered list means;

if when the arbitration operation is performed, the winning transaction selected last time the arbitration operation was performed had an entry in one of said at least one access timing ordered list, and that at least one access timing ordered list is still non-empty, the arbitration operation, unless a predetermined exception condition exists, selects as the winning transaction one of the pending transactions having an entry in that at least one access timing ordered list; and wherein if the winning transaction selected last time the arbitration operation was performed did not have an entry in one of said at least one access timing ordered list, or did have an entry in one of said at least one access timing ordered list but that at least one access timing ordered list is now empty, the arbitration operation is arranged to select as the winning transaction the pending transaction having an entry at a head position within one of said at least one priority based ordered list.

* * * * *